US009415272B2

(12) United States Patent
Watanabe et al.

(10) Patent No.: US 9,415,272 B2
(45) Date of Patent: Aug. 16, 2016

(54) MULTI-PIECE SOLID GOLF BALL

(71) Applicant: BRIDGESTONE SPORTS CO., LTD., Minato-ku, Tokyo (JP)

(72) Inventors: Hideo Watanabe, Chichibu (JP); Atsuki Kasashima, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 35 days.

(21) Appl. No.: 14/308,035

(22) Filed: Jun. 18, 2014

(65) Prior Publication Data

US 2015/0018125 A1    Jan. 15, 2015

(30) Foreign Application Priority Data

Jul. 9, 2013   (JP) ................................. 2013-143405

(51) Int. Cl.
| | |
|---|---|
| *A63B 37/06* | (2006.01) |
| *A63B 37/00* | (2006.01) |
| *C08G 18/76* | (2006.01) |
| *C08L 75/08* | (2006.01) |

(52) U.S. Cl.
CPC ......... *A63B 37/0076* (2013.01); *A63B 37/0024* (2013.01); *A63B 37/0043* (2013.01); *A63B 37/0045* (2013.01); *A63B 37/0051* (2013.01); *A63B 37/0058* (2013.01); *A63B 37/0062* (2013.01); *A63B 37/0064* (2013.01); *A63B 37/0092* (2013.01); *C08G 18/7671* (2013.01); *C08L 75/08* (2013.01); *A63B 37/008* (2013.01)

(58) Field of Classification Search
CPC ........... A63B 37/0051; A63B 37/0058; A63B 37/0059
USPC .......................................................... 473/376
See application file for complete search history.

(56) References Cited

U.S. PATENT DOCUMENTS

| | | | |
|---|---|---|---|
| 5,306,760 | A | 4/1994 | Sullivan |
| 5,312,857 | A | 5/1994 | Sullivan |
| 6,071,201 | A | 6/2000 | Maruko |
| 6,194,505 | B1 | 2/2001 | Sone et al. |
| 6,254,495 | B1 | 7/2001 | Nakamura et al. |
| 6,271,296 | B1 | 8/2001 | Nakamura et al. |
| 6,394,912 | B1 | 5/2002 | Nakamura et al. |
| 6,431,998 | B1 | 8/2002 | Nakamura et al. |
| 6,605,009 | B1 | 8/2003 | Nakamura et al. |
| 6,642,314 | B2 | 11/2003 | Sone et al. |

(Continued)

FOREIGN PATENT DOCUMENTS

| | | | |
|---|---|---|---|
| JP | 11-035633 A | | 2/1999 |
| JP | 11-164912 A | | 6/1999 |

(Continued)

*Primary Examiner* — Raeann Gorden
(74) *Attorney, Agent, or Firm* — Sughrue Mion, PLLC

(57) ABSTRACT

In a multi-piece solid golf ball which has a core with a two-layer structure composed of an inner layer and an outer layer, and has over the core a cover of two or more layers that includes an intermediate layer and an outermost layer, the core inner layer is formed primarily of a specific thermoplastic elastomer, the core outer layer is formed of a rubber composition consisting primarily of a rubber material, and the hardness relationship between the core inner layer and the core outer layer and the hardness relationship between the intermediate layer and the outermost layer have been optimized. This golf ball has an excellent flight performance on full shots with a driver (W#1) and also has good controllability in the short game and a good durability.

12 Claims, 1 Drawing Sheet

(56) References Cited

U.S. PATENT DOCUMENTS

| | | |
|---|---|---|
| 6,688,991 B2 | 2/2004 | Sullivan et al. |
| 6,756,436 B2 | 6/2004 | Rajagopalan et al. |
| 6,824,477 B2 | 11/2004 | Rajagopalan et al. |
| 6,894,098 B2 | 5/2005 | Rajagopalan et al. |
| 6,939,907 B2 | 9/2005 | Rajagopalan et al. |
| 6,962,539 B2 | 11/2005 | Sullivan et al. |
| 6,988,962 B2 | 1/2006 | Sullivan et al. |
| 7,041,009 B2 | 5/2006 | Sullivan et al. |
| 7,125,348 B2 | 10/2006 | Sullivan et al. |
| 7,157,512 B2 | 1/2007 | Rajagopalan et al. |
| 7,230,045 B2 | 6/2007 | Rajagopalan et al. |
| 7,285,059 B2 | 10/2007 | Sullivan et al. |
| 7,294,680 B2 | 11/2007 | Sone et al. |
| 7,641,571 B2 | 1/2010 | Hebert et al. |
| 7,648,427 B2 | 1/2010 | Isogawa |
| 7,652,086 B2 | 1/2010 | Sullivan et al. |
| 9,005,052 B1 * | 4/2015 | Parnell ............... A63B 37/0051 473/376 |
| 2008/0085784 A1 * | 4/2008 | Watanabe .......... A63B 37/0063 473/378 |
| 2011/0312441 A1 * | 12/2011 | Sullivan ............. A63B 37/0003 473/373 |
| 2012/0043686 A1 | 2/2012 | Ichikawa et al. |
| 2012/0046127 A1 | 2/2012 | Ichikawa et al. |

FOREIGN PATENT DOCUMENTS

| | | |
|---|---|---|
| JP | 2002-293996 A | 10/2002 |
| JP | 2012-040376 A | 3/2012 |
| JP | 2012-045382 A | 3/2012 |
| WO | 98/46671 A1 | 10/1998 |

* cited by examiner

MULTI-PIECE SOLID GOLF BALL

CROSS-REFERENCE TO RELATED APPLICATION

This non-provisional application claims priority under 35 U.S.C. §119(a) on Patent Application No. 2013-143405 filed in Japan on Jul. 9, 2013, the entire contents of which are hereby incorporated by reference.

TECHNICAL FIELD

The present invention relates to a multi-piece solid golf ball having a core with a two-layer structure composed of an inner layer and an outer layer, and a cover of at least two layers formed over the core. The invention relates in particular to a golf ball endowed with a flight performance, controllability and durability which are all more satisfactory to professional golfers and skilled amateur golfers.

BACKGROUND ART

Efforts have hitherto been made to provide golf balls with a multilayer structure so as to increase the distance traveled by the ball and enhance the feel of the ball at impact. In order to lower the spin rate, increase the initial velocity and further improve the feel at impact, various golf balls with multilayer structures of three or more layers have subsequently been described as well.

Golf balls having a somewhat soft cover, an intermediate layer made of an ionomer material that is relatively hard compared with the cover, and a solid core with a one- or two-layer structure that is made of a rubber material are currently in wide use among professional golfers and skilled amateur golfers as balls endowed with both excellent flight performance and excellent controllability. Such balls exhibit a high controllability in the short game because of the somewhat soft cover. In addition, owing to the combination of this cover with, on the inside thereof, a hard, high-resilience layer made of an ionomer material, such balls also suppress excessive spin on full shots with a driver and exhibit a high rebound.

Various balls of this type have hitherto been disclosed in, for example, U.S. Pat. Nos. 6,071,201, 6,254,495, 6,271,296, 6,394,912, 6,431,998, 6,605,009, 6,688,991, 6,756,436, 6,824,477, 6,894,098, 6,939,907, 6,962,539, 6,988,962, 7,041,009, 7,125,348, 7,157,512, 7,230,045, 7,285,059, 7,641,571 and 7,652,086, JP-A 2012-40376, JP-A 2012-45382 and U.S. Pat. No. 7,648,427.

In this way, there exists among professional golfers and skilled amateurs a strong demand for golf balls which enable such golfers to achieve a performance in keeping with their own level of skill. Developing a golf ball endowed with a flight performance, controllability and durability capable of satisfying larger numbers of golfers is thus important for expanding the golfer base.

CITATION LIST

Patent Document 1: U.S. Pat. No. 6,071,201
Patent Document 2: U.S. Pat. No. 6,254,495
Patent Document 3: U.S. Pat. No. 6,271,296
Patent Document 4: U.S. Pat. No. 6,394,912
Patent Document 5: U.S. Pat. No. 6,431,998
Patent Document 6: U.S. Pat. No. 6,605,009
Patent Document 7: U.S. Pat. No. 6,688,991
Patent Document 8: U.S. Pat. No. 6,756,436
Patent Document 9: U.S. Pat. No. 6,824,477
Patent Document 10: U.S. Pat. No. 6,894,098
Patent Document 11: U.S. Pat. No. 6,939,907
Patent Document 12: U.S. Pat. No. 6,962,539
Patent Document 13: U.S. Pat. No. 6,988,962
Patent Document 14: U.S. Pat. No. 7,041,009
Patent Document 15: U.S. Pat. No. 7,125,348
Patent Document 16: U.S. Pat. No. 7,157,512
Patent Document 17: U.S. Pat. No. 7,230,045
Patent Document 18: U.S. Pat. No. 7,285,059
Patent Document 19: U.S. Pat. No. 7,641,571
Patent Document 20: U.S. Pat. No. 7,652,086
Patent Document 21: JP-A 2012-40376
Patent Document 22: JP-A 2012-45382
Patent Document 23: U.S. Pat. No. 7,648,427

DISCLOSURE OF INVENTION

It is therefore an object of the invention to provide a multi-piece solid golf ball which, as a golf ball for professional golfers and skilled amateur golfers, achieves in particular an increased distance on full shots with a driver (W#1) and an improved controllability in the short game, and also has an excellent durability.

We have discovered that, in a golf ball having a solid core with a two-layer structure composed of an inner layer and an outer layer and having also a cover of two or more layers that includes one or more intermediate layer and an outermost layer, by forming the core inner layer of a soft thermoplastic elastomer, the spin rate on full shots is suppressed, enabling a good distance to be obtained; by forming the core outer layer of a rubber material that has a high resilience and is harder than the core inner layer, it is possible to obtain a high initial velocity on full shots and to suppress excess spin receptivity on full shots; by optimizing the hardness relationship between the core inner layer and the core outer layer, the durability is enhanced; and by giving the intermediate layer a higher surface hardness than the outermost layer, the spin rate on full shots can be even further suppressed. Moreover, we have also found that, by forming the outermost layer of a material composed primarily of a soft urethane, a high spin performance on approach shots in the short game can be achieved.

Accordingly, the invention provides a multi-piece solid golf ball having a core with a two-layer structure composed of an inner layer and an outer layer, and a cover of two or more layers which is formed over the core and includes one or more intermediate layer and an outermost layer. The core inner layer is formed primarily of one or more type of thermoplastic elastomer selected from the group consisting of polyester, polyamide, polyurethane, olefin and styrene-type thermoplastic elastomers, and has a material hardness, expressed in terms of Shore D hardness, of from 10 to 50. The core outer layer is formed of a rubber composition consisting primarily of a rubber material, and has a surface hardness, expressed in terms of Shore D hardness, of from 50 to 70. The intermediate layer has a higher surface hardness (Shore D hardness) than the outermost layer.

In the multi-piece solid golf ball of the invention, it is preferable for the core inner layer to be formed primarily of a polyether ester elastomer.

In the multi-piece solid golf ball of the invention, it is preferable for the core inner layer to have a diameter of from 10 to 30 mm and for the overall core to have a diameter of from 30 to 40 mm.

In the multi-piece solid golf ball of the invention, the outermost layer is preferably formed of a material composed primarily of urethane.

In the multi-piece solid golf ball of the invention, it is preferable for the outermost layer to be formed by injection-molding a single resin blend composed primarily of (A) a thermoplastic polyurethane and (B) a polyisocyanate compound, all the isocyanate groups in at least some portion of the polyisocyanate compound (B) being present in an unreacted state.

In a preferred embodiment of the inventive multi-piece solid golf ball of the invention, the core with a two-layer structure composed of an inner layer and an outer layer has formed over the periphery thereof a cover with a three-layer structure composed of an envelope layer encasing the core, an intermediate layer encasing the envelope layer, and an outermost layer encasing the intermediate layer.

In the foregoing embodiment of the invention, the envelope layer may be formed of a resin composition which includes: 100 parts by weight of a resin component composed of, in admixture, (a) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (b) a non-ionomeric thermoplastic elastomer in a weight ratio between 100:0 and 50:50;

(c) from 5 to 120 parts by weight of a fatty acid and/or fatty acid derivative having a molecular weight of from 228 to 1500; and (d) from 0.1 to 17 parts by weight of a basic inorganic metal compound capable of neutralizing un-neutralized acid groups in components (a) and (c).

In the foregoing embodiment of the invention, it is preferable for the core, the envelope layer, the intermediate layer and the outermost layer to have Shore D hardnesses which satisfy the following conditions:

envelope layer surface hardness<intermediate layer surface hardness>outermost layer surface hardness, and core inner layer center hardness<core inner layer surface hardness<core outer layer surface hardness.

In the same embodiment, the core and the envelope layer preferably have thicknesses which satisfy the following condition:

core inner layer radius>core outer layer thickness>envelope layer thickness.

In this embodiment of the invention, the envelope layer, intermediate layer and outermost layer preferably have thicknesses which satisfy the following condition:

envelope layer thickness>intermediate layer thickness>outermost layer thickness.

Advantageous Effects of Invention

This invention makes it possible to provide multi-piece solid golf balls which have an excellent flight performance on full shots with a driver (W#1), and also have a good controllability in the short game and a good durability.

BRIEF DESCRIPTION OF THE DIAGRAMS

DESCRIPTION OF EMBODIMENTS

The objects, features and advantages of the invention will become more apparent from the following detailed description, taken in conjunction with the foregoing diagrams.

Figure 1:
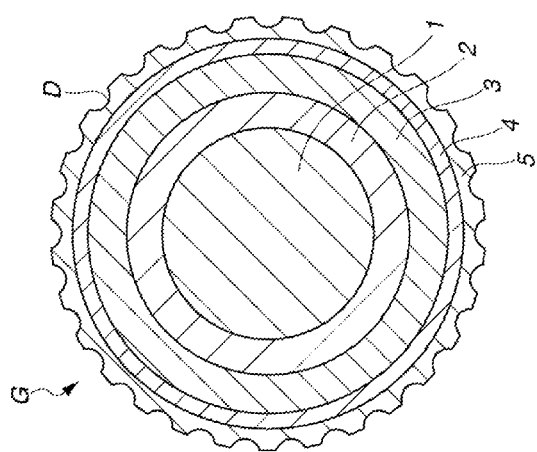
FIG. 1 is a schematic cross-sectional diagram showing the structure of a multi-piece solid golf ball according to the invention.

The multi-piece solid golf ball of the invention has a solid core with an inner layer and an outer layer (which solid core is sometimes referred to below simply as the "core"), and a cover of two or more layers that includes one or more intermediate layer and an outermost layer. FIG. 1 shows an example of the cross-sectional structure of a multi-piece solid golf ball according to the invention. The golf ball G shown here has a five-layer structure that includes a core inner layer 1, a core outer layer 2, an envelope layer 3 which encases the core outer layer 2, an intermediate layer 4 which encases the envelope layer 3, and an outermost layer 5 which encases the intermediate layer 4. The envelope layer is a layer adjacent to the core outer layer and, particularly in cases where the cover is formed of three or more layers, refers to the layer formed on the innermost side of the cover. In addition, numerous dimples D are generally formed on the surface of the outermost layer 5. These layers are each described in detail below.

First, the core, as noted above, has a two-layer structure composed of an inner layer and an outer layer. The inner layer and outer layer of the core are described below.

The diameter of the core inner layer, although not subject to any particular limitation, is preferably set to from 10 to 30 mm. The lower limit of this diameter may be set to more preferably at least 15 mm, and even more preferably at least 20 mm. The upper limit of this diameter may be set to more preferably not more than 28 mm, and even more preferably not more than 26 mm. If the diameter of the core inner layer is too small, the spin rate of the ball on full shots may become so high that a good distance is not achieved. On the other hand, if the diameter is too large, the durability of the ball to repeated impact may worsen, the feel at impact may become too hard, and the ball rebound may be inadequate, as a result of which a good distance may not be achieved.

The core inner layer has a center hardness which, although not subject to any particular limitation, may be set to a Shore D hardness of preferably at least 10, more preferably at least 20, and even more preferably at least 27. Although there is no particular upper limit on the center hardness of the core inner layer, the Shore D hardness may be set to not more than 50, preferably not more than 47, and even more preferably not more than 40. If the center hardness is too low, the resilience may become so low that an increased distance is not achieved, the feel at impact may become too soft, and the durability of the ball to cracking on repeated impact may worsen. On the other hand, at a center hardness which is too high, the spin rate may rise excessively, as a result of which an increased distance may not be achieved, and the feel at impact may be too hard.

The core inner layer has a surface hardness which, although not subject to any particular limitation, may be set to a Shore D hardness value of preferably at least 16, more preferably at least 26, and even more preferably at least 33. Although there is no particular upper limit on the surface hardness of the core inner layer, the Shore D hardness may be set to preferably not more than 56, more preferably not more than 53, and even more preferably not more than 46. If the surface hardness is too low, the feel at impact may become too soft and the durability of the ball to cracking under repeated impact may worsen. On the other hand, at a surface hardness which is too high, the feel at impact may become too hard and the durability to cracking on repeated impact may worsen.

The core inner layer has a material hardness which is set to a Shore D hardness value of at least 10, preferably at least 20, and more preferably at least 27. The material hardness of the core inner layer has an upper limit which is set to a Shore D hardness of not more than 50, preferably not more than 47, and more preferably not more than 40. If the material hardness is too low, the resilience becomes so low that an increased distance is not achieved, the feel at impact becomes too soft, and the durability to cracking on repeated impact worsens. On the other hand, if the material hardness is too high, the spin rate rises excessively so that an increased distance is not achieved, and the feel at impact becomes too high.

Here and below, "center hardness" refers to the hardness measured at the center of the cross-section obtained by cutting the core in half (through the center), and "surface hardness" refers to the hardness measured on the surface of the sphere (spherical surface) obtained by molding the material. "Material hardness" refers to the hardness measured for a sample obtained by molding the material into a sheet of a predetermined thickness, and "Shore D hardness" refers to the hardness measured using a type D durometer which conforms with ASTM D2240-95.

The core inner layer has a deflection when compressed under a final load of 1,275 N (130 kgf) from an initial load state of 98 N (10 kgf) which, although not subject to any particular limitation, may be set to preferably at least 3.6 mm, more preferably at least 4.0 mm, and even more preferably at least 4.5 mm. Although there is no particular upper limit on the deflection of the core inner layer, this deflection may be set to preferably not more than 10 mm, more preferably not more than 8.0 mm, and even more preferably not more than 7.0 mm. If the deflection is too large (that is, if the core inner layer is too soft), the feel of the ball at impact may be too soft and the durability to cracking on repeated impact may worsen. On the other hand, if the deflection is too small (that is, if the core inner layer is too hard), the spin rate may rise excessively, as a result of which a good distance may not be achieved, and the feel at impact may be too hard.

The core inner layer is formed using a thermoplastic elastomer. In the present invention, particularly from the standpoint of obtaining a high resilience and an excellent flight performance, the core inner layer is formed primarily of one or more type of thermoplastic elastomer selected from the group consisting of polyester, polyamide, polyurethane, olefin and styrene-type thermoplastic elastomers. A commercial product may be used as the thermoplastic elastomer. Illustrative examples include polyester-type thermoplastic elastomers such as Hytrel (DuPont-Toray Co., Ltd.), polyamide-type thermoplastic elastomers such as Pebax (Toray Industries, Inc.), polyurethane-type thermoplastic elastomers such as Pandex (Dainippon Ink & Chemicals, Inc.), olefin-type thermoplastic elastomers such as Santoprene (Monsanto Chemical Co.), and styrene-type thermoplastic elastomers such as Tuftec (Asahi Chemical Industry Co., Ltd.).

In this invention, from the standpoint of moldability and resilience, the use of a polyester-type thermoplastic elastomer is preferred, with the use of a polyether ester elastomer being especially preferred. Examples of such commercially available polyether ester elastomers include Hytrel 3046 and Hytrel 4047, both available from DuPont-Toray Co., Ltd.

A filler may be added to the core inner layer in order to adjust the specific gravity and increase durability. In addition, where necessary, various additives may be included in this core inner layer-forming material. For example, pigments, dispersants, antioxidants, light stabilizers, ultraviolet absorbers and mold release agents may be suitably included.

The core inner layer has a specific gravity which, although not particularly limited, may be set to preferably more than 1.0, more preferably at least 1.03, and even more preferably at least 1.05. Although there is no particular upper limit on the specific gravity of the core inner layer, this may be set to preferably less than 1.3, more preferably not more than 1.25, and even more preferably not more than 1.20. If the specific gravity is too large, the resilience of the core inner layer may decrease, as a result of which a good distance may not be achieved. On the other hand, if the specific gravity is too small, the resilience may decrease and the durability of the ball to repeated impact may worsen.

No particular limitation is imposed on the method of forming the core inner layer, although use may be made of a known method such as injection molding. Preferred use can be made of a method in which a given material is injected into the cavity of a core inner layer-forming mold.

Next, the core outer layer is described. The core outer layer is a layer formed over the core inner layer. A solid core having a two-layer structure is made up of, in combination, an inner layer and an outer layer.

The core outer layer has a thickness which, although not subject to any particular limitation, may be set to preferably at least 3 mm, more preferably at least 4 mm, and even more preferably at least 5 mm. Although there is no particular upper limit on the thickness of the core outer layer, this may be set to preferably not more than 10 mm, more preferably not more than 9 mm, and even more preferably not more than 8 mm. If the core outer layer is too thin, the spin rate-lowering effect on full shots may be inadequate, as a result of which a good distance may not be achieved, and the durability to cracking on repeated impact may worsen. If the core outer layer is too thick, the spin rate-lowering effect on full shots may be inadequate, as a result of which a good distance may not be achieved, and the feel of the ball on full shots may become too hard.

The overall solid core composed of the above core inner layer and core outer layer has a diameter which, although not subject to any particular limitation, may be set to preferably at least 30 mm, more preferably at least 34 mm, and even more preferably at least 35 mm. Although there is no particular upper limit on the diameter of the entire solid core, this may be set to preferably not more than 40 mm, more preferably not more than 39 mm, and even more preferably not more than 38 mm. If the diameter of the overall solid core falls outside of the above range, the ball may be too receptive to spin on full shots, as a result of which a good distance may not be obtained.

The surface hardness of the core outer layer is set to a Shore D hardness value of at least 50, preferably at least 53, and more preferably at least 56. The surface hardness of the core outer layer has an upper limit which is set to a Shore D hardness of not more than 70, preferably not more than 66, and more preferably not more than 63. If the surface hardness is too low, the ball rebound decreases and the spin rate-lowering effect on full shots becomes inadequate, as a result of which a good distance is not achieved. On the other hand, if the surface hardness is too high, the feel at impact becomes hard and the durability to cracking on repeated impact worsens.

The core outer layer is formed using a rubber composition. In the present invention, although not subject to any particular limitation, particularly from the standpoint of obtaining a high rebound and an excellent flight performance, this layer is preferably formed using a rubber composition containing the subsequently described polybutadiene as the base rubber.

The polybutadiene is not subject to any particular limitation, although the use of a polybutadiene having on the polymer chain a cis-1,4 bond content of at least 60 wt %, preferably at least 80 wt %, more preferably at least 90 wt %, and most preferably at least 95 wt %, is recommended. If the cis-1,4 bond content among the bonds on the molecule is too small, the rebound may decrease.

The content of the 1,2-vinyl bonds included in the polybutadiene is not subject to any particular limitation, although it is recommended that the content on the polymer chain be preferably not more than 2 wt %, more preferably not more than 1.7 wt %, and even more preferably not more than 1.5 wt %. If the 1,2-vinyl bond content is too high, the rebound may decrease.

From the standpoint of obtaining a molded and vulcanized material having a good resilience, the polybutadiene is preferably one which has been synthesized using a rare-earth catalyst or a Group VIII metal compound catalyst, and most preferably one which has been synthesized using a rare-earth catalyst. Also, where necessary, an organoaluminum compound, an alumoxane, a halogen-bearing compound, a Lewis base and the like may be used in combination with these catalysts. In the present invention, it is preferable to use, as the various foregoing compounds, those mentioned in JP-A 11-35633.

In the invention, of the above rare-earth catalysts, the use of a neodymium catalyst that employs a neodymium compound (a lanthanum series rare-earth compound) is especially recommended for obtaining a polybutadiene rubber having a high cis-1,4 bond content and a low 1,2-vinyl bond content at an excellent polymerization activity. Preferred examples of such rare-earth catalysts include those mentioned in JP-A 11-35633, JP-A 11-164912 and JP-A 2002-293996.

Illustrative examples of such lanthanide series rare-earth compounds include halides, carboxylates, alcoholates, thioalcoholates and amides of atomic number 57 to 71 metals.

Although not subject to any particular limitation, from the standpoint of enhancing resilience, it is recommended that the content of the above polybutadiene in the base rubber be preferably at least 10 wt %, more preferably at least 20 wt %, and even more preferably at least 40 wt %.

In the practice of the invention, rubbers other than the above polybutadiene may also be included, insofar as the objects of the invention are attainable. Illustrative examples include polybutadiene rubbers other than the above-described polybutadiene, styrene-butadiene rubbers, natural rubbers, isoprene rubbers and ethylene-propylene-diene rubbers. These may be used singly or as a combination of two or more types.

In the invention, additives such as the subsequently described co-crosslinking agents, organic peroxides, antioxidants, inert fillers and organosulfur compounds may be suitably blended with the above base rubber.

Illustrative examples of co-crosslinking agents include unsaturated carboxylic acids and metal salts of unsaturated carboxylic acids.

Suitable unsaturated carboxylic acids include, but are not particularly limited to, acrylic acid, methacrylic acid, maleic acid and fumaric acid. The use of acrylic acid or methacrylic acid is especially preferred.

Suitable metal salts of unsaturated carboxylic acids include, but are not particularly limited to, the above unsaturated carboxylic acids neutralized with a desired metal ion. Specific examples include the zinc salts and magnesium salts of methacrylic acid and acrylic acid. The use of zinc acrylate is especially preferred.

The amount of the co-crosslinking agent included in the rubber composition per 100 parts by weight of the base rubber, although not subject to any particular limitation, may be set to preferably at least 10 parts by weight, more preferably at least 20 parts by weight, and even more preferably at least 30 parts by weight. There is no particular upper limit in the amount of the co-crosslinking agent per 100 parts by weight of the base rubber, although this amount may be set to preferably not more than 60 parts by weight, more preferably not more than 50 parts by weight, even more preferably not more than 45 parts by weight, and most preferably not more than 40 parts by weight. Too much co-crosslinking agent may make the ball too hard, resulting in an unpleasant feel at impact. On the other hand, too little co-crosslinking agent may lower the rebound.

Commercially available products may be used as the organic peroxide in the rubber composition. For example, preferred use may be made of Percumyl D, Perhexa C-40, Perhexa 3M (all produced by NOF Corporation) or Luperco 231XL (Atochem Co.). These may be used singly or as a combination of two or more thereof.

The amount of organic peroxide included in the rubber composition per 100 parts by weight of the base rubber, although not subject to any particular limitation, may be set to preferably at least 0.1 part by weight, more preferably at least 0.3 part by weight, even more preferably at least 0.5 part by weight, and most preferably at least 0.7 part by weight. There is no particular upper limit in the amount of organic peroxide per 100 parts by weight of the base rubber, although this amount may be set to preferably not more than 5 parts by weight, more preferably not more than 4 parts by weight, even more preferably not more than 3 parts by weight, and most preferably not more than 2 parts by weight. Too much or too little organic peroxide may make it impossible to obtain a good feel at impact, durability and rebound.

Commercially available products may be used as the antioxidant in the rubber composition. Illustrative examples include Nocrac NS-6 and Nocrac NS-30 (both available from Ouchi Shinko Chemical Industry Co., Ltd.), and Yoshinox 425 (Yoshitomi Pharmaceutical Industries, Ltd.). These may be used singly, or two or more may be used in combination.

The amount of antioxidant included in the rubber composition can be set to more than 0, and may be set to preferably at least 0.05 part by weight, and more preferably at least 0.1 part by weight, per 100 parts by weight of the base rubber. There is no particular upper limit in the amount of antioxidant included, although this amount may be set to preferably not more than 3 parts by weight, more preferably not more than 2 parts by weight, even more preferably not more than 1 part by weight, and most preferably not more than 0.5 part by weight. Too much or too little antioxidant may make it impossible to obtain a good rebound and durability.

Preferred use may be made of inert fillers such as zinc oxide, barium sulfate and calcium carbonate in the rubber composition. These may be used singly, or two or more may be used in combination.

The amount of inert filler included in the rubber composition, although not subject to any particular limitation, may be set to preferably at least 1 part by weight, and more preferably at least 5 parts by weight, per 100 parts by weight of the base rubber. There is no particular upper limit in the amount of inert filler included per 100 parts by weight of the base rubber, although this amount may be set to preferably not more than 50 parts by weight, more preferably not more than 40 parts by weight, and even more preferably not more than 30 parts by weight. Too much or too little inorganic filler may make it impossible to achieve a suitable weight and a good rebound.

In addition, to enhance rebound by the golf ball, it is preferable for the rubber composition to include an organosulfur compound. The organosulfur compound is not subject to any particular limitation, provided it is capable of enhancing the golf ball rebound. Preferred use may be made of thiophenols, thionaphthols, halogenated thiophenols, and metal salts of these. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and diphenylpolysulfides, dibenzylpolysulfides, dibenzoylpolysulfides, dibenzothiazoylpolysulfides and dithiobenzoylpolysulfides having 2 to 4 sulfurs. In this invention, of the above, the use of diphenyldisulfide or the zinc salt of pentachlorothiophenol is especially preferred.

The amount of the organosulfur compound included per 100 parts by weight of the base rubber, although not subject to any particular limitation, may be set to preferably at least 0.05 part by weight, and more preferably at least 0.1 part by weight. There is no upper limit in the amount of organosulfur compound included per 100 parts by weight of the base rubber, although this amount may be set to preferably not more than 5 parts by weight, more preferably not more than 3 parts by weight, and even more preferably not more than 2.5 parts by weight. Including too little may make it impossible to obtain a sufficient rebound-enhancing effect. On the other hand, if too much is included, the rebound-enhancing effect (particularly on shots with a W#1) reaches a peak beyond which no further effect can be expected, in addition to which the core may become too soft, possibly worsening the feel of the ball at impact.

The specific gravity of the core outer layer, although not subject to any particular limitation, may be set to preferably not more than 1.35, more preferably not more than 1.30, and even more preferably not more than 1.25. Although there is no particular lower limit on the specific gravity, this may be set to preferably at least 1.05, more preferably at least 1.12, and even more preferably at least 1.20. If the specific gravity is too large, the rebound may decrease, as a result of which a good distance may not be achieved. If the specific gravity is too small, achieving the desired hardness becomes difficult; also, the rebound may decrease, as a result of which a good distance may not be achieved.

The core outer layer forming method may be a known method and is not subject to any particular limitation, although preferred use may be made of the following method. First, a core outer layer-forming material is placed in a predetermined mold and subjected to primary vulcanization (semi-vulcanization) so as to produce a pair of hemispherical half-cups. Then, a prefabricated inner core layer is enclosed within the half-cups produced as just described, and secondary vulcanization (complete vulcanization) is carried out in this state. That is, advantageous use may be made of a process in which the vulcanization step is divided into two stages. Alternatively, advantageous use may be made of a process in which the core outer layer-forming material is injection-molded over the core inner layer.

Next, the envelope layer is described in detail.

The envelope layer is a layer which covers the periphery of the above core outer layer. In the invention, the thickness of this layer, although not subject to any particular limitation, may be set to preferably at least 0.8 mm, more preferably at least 1.0 mm, and even more preferably at least 1.2 mm. Although there is no particular upper limit on the thickness of the envelope layer, this thickness may be set to preferably not more than 4.0 mm, more preferably not more than 3.0 mm, and even more preferably not more than 2.0 mm. At an envelope layer thickness outside of the above range, the spin rate-lowering effect on full shots with a driver (W#1) may be inadequate, as a result of which a good distance may not be achieved.

The envelope layer has a surface hardness which, although not subject to any particular limitation, may be set to a Shore D hardness value of preferably at least 46, more preferably at least 51, and even more preferably at least 54. Although there is no particular upper limit on the surface hardness of the envelope layer, the Shore D hardness may be set to preferably not more than 68, more preferably not more than 66, and even more preferably not more than 61. The material hardness of the envelope layer, although not subject to any particular limitation, may be set to a Shore D hardness value of preferably at least 40, more preferably at least 45, and even more preferably at least 48. Although there is no particular upper limit in this material hardness, the Shore D hardness may be set to preferably not more than 62, more preferably not more than 60, and even more preferably not more than 55. If the envelope layer hardness is too low, the spin receptivity of the ball on full shots may be excessive, as a result of which a good distance may not be obtained. On the other hand, if the envelope layer hardness is too high, the ball may have a poor durability to cracking on repeated impact and the feel at impact may be too hard.

As used herein, "material hardness" refers to the hardness measured for a sample obtained by molding the material into a sheet of a predetermined thickness (the same applies below). The surface hardness and Shore D hardness are as defined above.

In the present invention, illustrative, non-limiting, examples of resin compositions suitable for forming the envelope layer include the resin compositions formulated as shown below.

It is preferable to use as the envelope layer-forming material a resin composition made of:

100 parts by weight of a resin component composed of, in admixture,
(a) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(b) a non-ionomeric thermoplastic elastomer in a weight ratio between 100:0 and 50:50;
(c) from 5 to 120 parts by weight of a fatty acid and/or fatty acid derivative having a molecular weight of from 228 to 1500; and
(d) from 0.1 to 17 parts by weight of a basic inorganic metal compound capable of neutralizing un-neutralized acid groups in components (a) and (c).

Components (a) to (d) are described below.

Component (a) is the base resin of the envelope layer-forming resin composition in which component (a-1) is an olefin-unsaturated carboxylic acid random copolymer and/or a metal ion neutralization product of an olefin-unsaturated carboxylic acid random copolymer, and component (a-2) is an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer.

Here, the olefins in above components (a-1) and (a-2) are olefins in which the number of carbons is generally at least 2 but not more than 8, and preferably not more than 6. Specific examples include ethylene, propylene, butene, pentene, hexene, heptene and octene. Ethylene is especially preferred.

Examples of the unsaturated carboxylic acid include acrylic acid, methacrylic acid, maleic acid and fumaric acid. Acrylic acid and methacrylic acid are especially preferred.

The unsaturated carboxylic acid ester in above component (a-2) is exemplified by lower alkyl esters of the above unsaturated carboxylic acids. Illustrative examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, i-butyl acrylate) is especially preferred.

The olefin-unsaturated carboxylic acid random copolymer of above component (a-1) and the olefin-unsaturated carboxylic acid-unsaturated carboxylic acid ester random terpolymer of above component (a-2) (these are sometimes collectively referred to below as "random copolymers") can each be obtained by using a known method to random copolymerize the above-described olefin, unsaturated carboxylic acid and, where necessary, unsaturated carboxylic acid ester.

It is desirable for each of the above random copolymers to have a controlled content of unsaturated carboxylic acid (acid content). Specifically, it is recommended that the content of unsaturated carboxylic acid in component (a-1) be preferably at least 4 wt %, more preferably at least 6 wt %, even more preferably at least 8 wt %, and most preferably at least 10 wt %, but preferably not more than 30 wt %, more preferably not more than 20 wt %, even more preferably not more than 18 wt %, and most preferably not more than 15 wt %. It is recommended that the content of unsaturated carboxylic acid in component (a-2) be preferably at least 4 wt %, more preferably at least 6 wt %, and even more preferably at least 8 wt %, but preferably not more than 15 wt %, more preferably not more than 12 wt %, and even more preferably not more than 10 wt %. If the unsaturated carboxylic acid content in component (a-1) and/or component (a-2) is too low, the resilience may decrease, whereas if it is too high, the processability of the resin material may decrease.

The metal ion neutralization product of an olefin-unsaturated carboxylic acid random copolymer in component (a-1) and the metal ion neutralization product of an olefin-unsaturated carboxylic acid-unsaturated carboxylic acid ester random terpolymer in component (a-2) (these are collectively referred to below as "metal ion neutralization products of the random copolymers") can be obtained by neutralizing some or all of the acid groups on the respective above random copolymers with metal ions.

Illustrative examples of metal ions for neutralizing acid groups in the above random copolymers include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. In the present invention, preferred use may be made of $Na^+$, $Li^+$, $Zn^{++}$ and $Mg^{++}$; $Mg^{++}$ and $Zn^{++}$ are especially recommended. The degree of neutralization of these random copolymers with the above metal ions is not subject to any particular limitation. These neutralization products may be obtained by a known method. For example, the above metal ions may be introduced into the above random copolymer by using compounds such as formates, acetates, nitrates, carbonates, bicarbonates, oxides, hydroxides and alkoxides of these metal ions.

Commercially available products may be used as component (a). Examples of commercial products that may be used as the random copolymer in component (a-1) include Nucrel 1560, Nucrel 1214 and Nucrel 1035 (all products of DuPont-Mitsui Polychemicals Co., Ltd.), and Escor 5200, Escor 5100 and Escor 5000 (all products of ExxonMobil Chemical). Examples of commercial products that may be used as the metal ion neutralization product of the random copolymer in component (a-1) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (E.I. DuPont de Nemours & Co.), and Iotek 3110 and Iotek 4200 (ExxonMobil Chemical). Examples of commercial products that may be used as the random copolymer in component (a-2) include Nucrel AN 4311, Nucrel AN 4318, Nucrel AN 4319 and Nucrel AN 4221C (all products of DuPont-Mitsui Polychemicals Co., Ltd.), and Escor ATX325, Escor ATX320 and Escor ATX310 (all products of ExxonMobil Chemical). Examples of commercial products that may be used as the metal ion neutralization product of the random copolymer in component (a-2) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical). These may be used singly or in combinations of two or more thereof as the respective components.

Examples of sodium-neutralized ionomer resins which are suitable as the metal ion neutralization products of the above random copolymers include Himilan 1605, Himilan 1601 and Surlyn 8120.

Component (a-1) and component (a-2) may be used singly, or both may be used together, as the base resin of the resin composition for the envelope layer. The two components are blended in a weight ratio of component (a-1) to component (a-2) of typically from 100:0 to 0:100, although a weight ratio of from 50:50 to 0:100 is preferred.

The above non-ionomeric thermoplastic elastomer (b) is a component which is preferably included so as to further improve the feel of the golf ball at impact and the ball rebound. In the present invention, the base resin (component (a)) and the non-ionomeric thermoplastic elastomer (component (b)) are sometimes referred to collectively as "the resin component." Examples of component (b) include olefin-type elastomers, styrene-type elastomers, polyester-type elastomers, urethane-type elastomers and polyamide-type elastomers. In the present invention, to further increase the rebound, it is especially preferable to use an olefin-type elastomer or a polyester-type elastomer. A commercially available product may be used as component (b). Illustrative examples include the olefin-type elastomer Dynaron (JSR Corporation) and the polyester-type elastomer Hytrel (DuPont-Toray Co., Ltd.). These may be used singly or as combinations of two or more thereof.

The amount of component (b) included, expressed as the weight ratio with above component (a), or (a):(b), may be set to between 100:0 and 50:50, and preferably between 100:0 and 60:40. If component (b) accounts for more than 50 wt % of the resin component, the compatibility of the respective components may decrease, which may markedly lower the durability of the golf ball.

Component (c) is a fatty acid and/or fatty acid derivative having a molecular weight of at least 228. This is a component which helps to improve the flow properties of the resin composition. Compared with the thermoplastic resin in the above resin component, component (c) has a very low molecular weight and, by suitably adjusting the melt viscosity of the mixture, helps in particular to improve the flow properties. Because the fatty acid (or fatty acid derivative) of the invention includes a high content of acid groups (or derivatives thereof) having a molecular weight of at least 228, there is little loss of resilience due to addition.

The molecular weight of the fatty acid or fatty acid derivative of component (c) may be set to at least 228, preferably at least 256, more preferably at least 280, and even more preferably at least 300. The upper limit of the molecular weight may be set to not more than 1500, preferably not more than 1000, even more preferably not more than 600, and most preferably not more than 500. If the molecular weight is too low, the heat resistance cannot be improved and the acid group content becomes too high, which may result in a smaller flow-improving effect due to interactions with acid groups present in component (a). On the other hand, if the molecular weight is too high, a distinct flow-improving effect may not be achieved.

It is preferable to use as the fatty acid of component (c) an unsaturated fatty acid containing a double bond or triple bond on the alkyl moiety, or a saturated fatty acid in which the bonds on the alkyl moiety are all single bonds. The number of carbons on one molecule of the fatty acid may be set to at least 18, preferably at least 20, more preferably at least 22, and even more preferably at least 24. The upper limit in the number of carbons may be set to not more than 80, preferably not more than 60, more preferably not more than 40, and even more preferably not more than 30. Too few carbons, in addition to possibly resulting in a poor heat resistance, may also, by making the acid group content relatively high, lead to excessive interactions with acid groups present in the resin component, thereby diminishing the flow-improving effect. On the other hand, too many carbons increases the molecular weight, as a result of which a distinct flow-improving effect may not be achieved.

Illustrative examples of the fatty acid of component (c) include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred.

The fatty acid derivative is exemplified by metallic soaps in which the proton on the acid group of the fatty acid has been replaced with a metal ion. Examples of metal ions that may be used in the metal soap include $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of the fatty acid derivative of component (c) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred. These may be used singly or as combinations of two or more thereof.

The amount of component (c) included per 100 parts by weight of the above resin component which includes components (a) and (b) may be set to at least 5 parts by weight, preferably at least 10 parts by weight, more preferably at least 15 parts by weight, and even more preferably at least 18 parts by weight. The upper limit is set to not more than 120 parts by weight, preferably not more than 80 parts by weight, more preferably not more than 60 parts by weight, and even more preferably not more than 50 parts by weight. If the amount of component (c) included is too small, the melt viscosity may decrease, lowering the processability. On the other hand, if the amount of component (c) is too large, the durability may decrease.

In this invention, use may also be made of, as a mixture of the above-described components (a) and (c), a known metallic soap-modified ionomer (see, for example, U.S. Pat. No. 5,312,857, U.S. Pat. No. 5,306,760, and WO 98/46671).

The basic inorganic metal compound of component (d) is included for the purpose of neutralizing acid groups in components (a) and (c). If component (d) is not included, particularly in cases where a metal-modified ionomer resin alone (e.g., a metallic soap-modified ionomer resin mentioned in the above-cited patent publications, alone) is mixed under applied heat, the metallic soap and un-neutralized acid groups present on the ionomer undergo an exchange reaction as shown below, generating a fatty acid. Because this generated fatty acid has a low thermal stability and readily vaporizes during molding, not only does it cause molding defects, when the generated fatty acid deposits on the surface of the molding, it causes a marked decline in paint film adhesion.

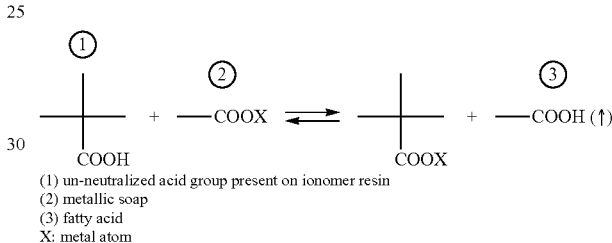

(1) un-neutralized acid group present on ionomer resin
(2) metallic soap
(3) fatty acid
X: metal atom In this invention, by including component (d), acid groups on components (a) and (c) are neutralized, making it possible to suppress the formation of fatty acid which causes trouble such as molding defects. By thus including component (d) and suppressing fatty acid formation, the thermal stability of the material increases, along with which a good moldability is imparted, thereby conferring the excellent property of enhancing resilience as a golf ball material.

It is recommended that component (d) be a basic inorganic metal compound which neutralizes acid groups in components (a) and (c), and preferably a monoxide. Because it has a high reactivity with the ionomer resin and the reaction by-products contain no organic matter, the degree of neutralization of the resin composition can be increased without a loss of thermal stability.

Illustrative examples of the metal ion used here in the basic inorganic metal compound include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Basic inorganic fillers containing these metal ions may be used as the inorganic metal compound. Illustrative examples include magnesium oxide, magnesium hydroxide, magnesium carbonate, zinc oxide, sodium hydroxide, sodium carbonate, calcium oxide, calcium hydroxide, lithium hydroxide and lithium carbonate. These may be used singly or as combinations of two or more thereof. In the present invention, of the above, a hydroxide or a monoxide is especially recommended. Calcium hydroxide and magnesium oxide, which have a high reactivity with component (a), are preferred.

The amount of component (d) included per 100 parts by weight of the resin component may be set to at least 0.1 part by weight, preferably at least 0.5 part by weight, more preferably at least 1 part by weight, and even more preferably at least 2 parts by weight. The upper limit is not more than 17 parts by weight, preferably not more than 15 parts by weight, more preferably not more than 13 parts by weight, and even more preferably not more than 10 parts by weight. If the amount of component (d) included is too small, improvements in the thermal stability and resilience may not be observed. On the other hand, if it is too large, the presence of excessive basic inorganic metal compound may have the opposite effect of lowering the heat resistance of the composition.

The mixture obtained by mixing components (a) to (d) has a degree of neutralization, based on the total amount of acid groups in the mixture, which is set to at least 50 mol %, preferably at least 60 mol %, more preferably at least 70 mol %, and even more preferably at least 80 mol %. With such a high degree of neutralization, even in cases where, for example, a metallic soap-modified ionomer resin is used, exchange reactions between the metallic soap and un-neutralized acid groups present in the ionomer resin are less likely to arise during mixture under heating, thereby reducing the likelihood of declines in thermal stability, moldability and resilience.

Various additives may be optionally included within the resin composition containing components (a) to (d). For example, additives such as pigments, dispersants, antioxidants, ultraviolet absorbers and light stabilizers may be suitably included. These additives are used in an amount which, although not subject to any particular limitation, is generally at least 0.1 part by weight, preferably at least 0.5 part by weight, and more preferably at least 1 part by weight, per 100 parts by weight of the resin component. The upper limit is not more than 10 parts by weight, preferably not more than 6 parts by weight, and more preferably not more than 4 parts by weight.

The resin composition may be obtained by mixing above components (a) to (d) under applied heat. For example, the resin composition may be obtained by mixture using a known mixing apparatus such as a kneading-type twin-screw extruder, a Banbury mixer or a kneader at a heating temperature of between 150 and 250° C. Alternatively, direct use may be made of a commercial product, illustrative examples of which include those available under the trade names HPF 1000, HPF 2000 and HPF AD1027, as well as the experimental material HPF SEP1264-3, all produced by E.I. DuPont de Nemours & Co.

The method of forming the envelope layer may be a known method and is not subject to any particular limitation. For example, use may be made of a method which involves setting a prefabricated core within a mold, and then injection-molding the resin composition prepared as described above over the core.

Next, the intermediate layer is described.

The intermediate layer is a layer which, in the golf ball shown in FIG. 1, covers the periphery of the envelope layer. In this invention, the thickness of the intermediate layer is not subject to any particular limitation, although it is recommended that the intermediate layer be set to a thickness of preferably at least 0.5 mm, more preferably at least 0.8 mm, and even more preferably at least 1.0 mm. Although there is no particular upper limit on the intermediate layer thickness, this thickness may be set to preferably not more than 2.5 mm, more preferably not more than 2.0 mm, and even more preferably not more than 1.5 mm. If the thickness of the intermediate layer is larger than the above range or smaller than the thickness of the subsequently described outermost layer, the spin rate-lowering effect on full shots with a driver (W#1) may be inadequate, as a result of which a good distance may not be achieved. Also, if the thickness of the intermediate layer is too small, the durability of the ball to cracking on repeated impact and the low-temperature durability may worsen.

The surface hardness of the intermediate layer, although not subject to any particular limitation, may be set to a Shore D value of preferably at least 60, more preferably at least 64, and even more preferably at least 66. Although there is no particular upper limit on the surface hardness of the intermediate layer, the Shore D hardness may be set to preferably not more than 80, more preferably not more than 76, and even more preferably not more than 73. The material hardness of the intermediate layer, although not subject to any particular limitation, may be set to a Shore D value of preferably at least 53, more preferably at least 58, and even more preferably at least 60. Although there is no particular upper limit on this material hardness, the Shore D hardness may be set to preferably not more than 75, more preferably not more than 70, and even more preferably not more than 67. If the hardness of the intermediate layer is too low, the ball may be too receptive to spin on full shots, which may result in a poor distance. On the other hand, if the hardness is too high, the durability to cracking on repeated impact may worsen or the feel of the ball when hit with a putter or on short approach shots may become too hard.

No particular limitation is imposed on the material used to form the intermediate layer, although an ionomer resin is generally used. Commercial products may be used as the ionomer resin. Illustrative examples include sodium-neutralized ionomer resins such as Himilan 1605, Himilan 1601 and AM7318 (all products of DuPont-Mitsui Polychemicals Co., Ltd.), and Surlyn 8120 (E.I. DuPont de Nemours & Co.); and zinc-neutralized ionomer resins such as Himilan 1557, Himilan 1706 and AM7317 (all products of DuPont-Mitsui Polychemicals Co., Ltd.). These may be used singly, or two or more may be used in combination.

These ionomer resins may be used singly or as combinations of two or more types. In the invention, from the standpoint of increasing the rebound of the ball, it is especially preferable to use a combination of a zinc-neutralized ionomer resin with a sodium-neutralized ionomer resin. In such a case, the compounding ratio by weight between the zinc-neutralized ionomer resin and the sodium-neutralized ionomer resin, although not subject to any particular limitation, may be set to generally between 25:75 and 75:25, preferably between 35:65 and 65:35, and more preferably between 45:55 and 55:45. At a compounding ratio outside the above range, the rebound may become too low, making it impossible to achieve the desired flight performance, the durability to cracking when repeatedly struck at normal temperatures may worsen, and the durability to cracking at low (subzero Celsius) temperatures may worsen.

In addition, various additives may be optionally included in the material used to form the intermediate layer. For example, additives such as pigments, dispersants, antioxidants, light stabilizers, ultraviolet absorbers and mold release agents may be suitably included.

The specific gravity of the intermediate layer, although not particularly limited, may be set to preferably less than 1.0, more preferably not more than 0.98, and even more preferably not more than 0.96. The lower limit in the specific gravity may be set to preferably at least 0.90, and more preferably at least 0.94. At an intermediate layer specific gravity outside the above range, the rebound becomes small, as a result of which a good distance may not be achieved, and the durability to cracking under repeated impact may worsen.

The method of forming the intermediate layer is not subject to any particular limitation, although a known method may be employed for this purpose. For example, use may be made of a method that involves injection-molding an intermediate layer-forming material over the envelope layer, or a method that involves prefabricating a pair of hemispherical half-cups from the intermediate layer-forming material, then enclosing an intermediate product (in this case, the sphere obtained by forming the envelope layer over the solid core) within these half-cups and molding under heat and pressure at between 140 and 180° C. for 2 to 10 minutes.

Next, the outermost layer is described.

The surface hardness of the outermost layer (that is, the surface hardness of the ball), although not subject to any particular limitation, may be set to a Shore D value of preferably at least 45, more preferably at least 50, and even more preferably at least 55. Although there is no particular upper limit on the surface hardness of the outermost layer, the Shore D hardness may be set to preferably not more than 70, more preferably not more than 65, and even more preferably not more than 60. The material hardness of the outermost layer, although not subject to any particular limitation, may be set to a Shore D value of preferably at least 30, more preferably at least 40, and even more preferably at least 43. Although there is no particular upper limit in the material hardness, the Shore D hardness may be set to preferably not more than 60, more preferably not more than 50, and even more preferably not more than 47. If the hardness of the outermost layer is too low, the ball may be too receptive to spin on full shots, which may result in a poor distance. On the other hand, if the hardness is too high, the ball may not be receptive to spin on approach shots, as a result of which the controllability may be inadequate even for professional golfers and skilled amateur golfers.

The thickness of the outermost layer is not subject to any particular limitation, although it is recommended that the thickness be set to preferably at least 0.3 mm, more preferably at least 0.5 mm, and even more preferably at least 0.7 mm. There is no particular upper limit in the thickness of the outermost layer, although the thickness may be set to preferably not more than 1.5 mm, more preferably not more than 1.2 mm, and even more preferably not more than 1.0 mm. If the an outermost layer thickness is too large, the rebound of the ball when struck with a driver (W#1) may be inadequate or the spin rate may be too high, as a result of which a good distance may not be obtained. On the other hand, if the outermost layer thickness is too small, the ball may have a poor scuff resistance or may have an inadequate controllability even for professional golfers and skilled amateur golfers.

Although not particularly limited, from the standpoint of ball controllability and scuff resistance, the outermost layer is preferably formed using a composition consisting primarily of urethane. From the standpoint of amenability to mass production, the use of a thermoplastic polyurethane is especially preferred in this invention. More specifically, preferred use may be made of a material which includes the subsequently described thermoplastic polyurethane (A) and isocyanate compound (B).

This material is a single resin blend in which the primary components are (A) a thermoplastic polyurethane and (B) a polyisocyanate compound. By forming an outermost layer that is composed primarily of such a material, it is possible to achieve an excellent feel, controllability, cut resistance, scuff resistance and durability to cracking on repeated impact without a loss of resilience.

As used herein, reference to a "single" resin blend means that the resin blend is not fed as a plurality of types of pellets, but rather is supplied to an injection molding machine or the like as one type of pellet prepared by incorporating a plurality of ingredients into the individual pellets.

To fully achieve the advantageous effects of the invention, a necessary and sufficient amount of unreacted isocyanate groups should be present within the outermost layer-forming resin material. Specifically, it is recommended that the combined weight of components A and B be preferably at least 60%, and more preferably at least 70%, of the overall weight of the outermost layer. Components A and B are described in detail below.

The thermoplastic polyurethane serving as component A has a structure which includes soft segments composed of a polymeric polyol that is a long-chain polyol (i.e., a polymeric glycol), and hard segments composed of a chain extender and an isocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of a cyclic ether. The polyether polyol may be used singly or as a combination of two or more thereof. Of these, preferred use may be made of poly(tetramethylene glycol) and poly(methyltetramethylene glycol).

It is preferable for these long-chain polyols to have a number-average molecular weight which, although not subject to any particular limitation, is in the range of 1,500 to 5,000. By using a long-chain polyol having a number-average molecular weight within this range, golf balls made of a thermoplastic polyurethane composition having excellent properties such as the above-described resilience and manufacturability can be reliably obtained. The number-average molecular weight of the long-chain polyol is more preferably in the range of 1,700 to 4,000, and even more preferably in the range of 1,900 to 3,000.

As used herein, "number-average molecular weight of the long-chain polyol" refers to the number-average molecular weight computed based on the hydroxyl number measured in accordance with JIS K-1557.

The chain extender used, although not subject to any particular limitation, is preferably one employed in the prior art relating to thermoplastic polyurethanes. For example, in the invention, use may be made of a low-molecular-weight compound which has a molecular weight of 400 or less and includes on the molecule two or more active hydrogen atoms capable of reacting with isocyanate groups. Of these, the use of an aliphatic diol having 2 to 12 carbons is preferred. Illustrative examples include 1,4-butylene glycol, 1,2-ethylene glycol, 1,3-butanediol, 1,6-hexanediol and 2,2-dimethyl-1,3-propanediol. The use of 1,4-butylene glycol is especially preferred.

The isocyanate compound is not subject to any particular limitation; preferred use may be made of one that is employed in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the isocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The ratio of active hydrogen atoms to isocyanate groups in the above polyurethane-forming reaction can be controlled within a desirable range so as to make it possible to obtain a golf ball which is composed of a thermoplastic polyurethane composition and has various improved properties, such as rebound, spin performance, scuff resistance and manufacturability. Specifically, in preparing a thermoplastic polyurethane by reacting the above long-chain polyol, isocyanate compound and chain extender, it is desirable to use the respective components in proportions such that the amount of isocyanate groups included on the isocyanate compound per mole of active hydrogen atoms on the long-chain polyol and the chain extender is between 0.95 and 1.05 moles.

No particular limitation is imposed on the method of preparing component A. Production may be carried out by a prepolymer process or a one-shot process which uses a long-chain polyol, a chain extender and a polyisocyanate compound, and employs a known urethane-forming reaction. Of these, a process in which melt polymerization is carried out in a substantially solvent-free state is preferred. Production by continuous melt polymerization using a multiple screw extruder is especially preferred.

A commercially available product may be used as component A. Illustrative examples include Pandex T-8295, Pandex T-8290, Pandex T-8283 and Pandex T-8260 (all available from DIC Bayer Polymer, Ltd.).

Next, concerning the polyisocyanate compound used as component B, it is essential that, in at least some portion thereof within the single resin blend, all the isocyanate groups on the molecule remain in an unreacted state. That is, polyisocyanate compound in which all the isocyanate groups on the molecule are in a completely free state must be present within the single resin blend; such a polyisocyanate compound may be present together with a polyisocyanate compound in which some of the isocyanate groups on the molecule are in a free state.

Various types of isocyanates may be employed without particular limitation as this polyisocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of, e.g., the rise in viscosity that accompanies the reaction with the thermoplastic polyurethane serving as component A and the physical properties of the resulting material.

In the practice of the invention, although not an essential constituent, a thermoplastic elastomer other than the above-described thermoplastic polyurethane may be included as component C together with components A and B. Including this component C in the above resin blend makes it possible to further improve the flow properties of the resin blend and enables increases to be made in properties required of the outermost layer-forming material, such as resilience and scuff resistance.

This component C, which is a thermoplastic elastomer other than the above thermoplastic polyurethane, is exemplified by one or more thermoplastic elastomer selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of polyester elastomers, polyamide elastomers and polyacetals is especially preferred because the resilience and scuff resistance are enhanced, owing to reactions with isocyanate groups, while at the same time a good manufacturability is retained.

The compounding ratios of above components A to C are not subject to any particular limitation. However, to fully achieve the advantageous effects of the invention, the weight ratio A:B:C of the respective components may be set to preferably between 100:2:50 and 100:50:0, and more preferably between 100:2:50 and 100:30:8.

In the practice of the invention, the resin blend is prepared by mixing together above component A, component B and also, if necessary, component C. It is preferable to select the mixing conditions such that, of the isocyanate compound, at least some isocyanate compound is present in which all the isocyanate groups on the molecule remain in an unreacted state. For example, it is preferable to furnish treatment such as purging with an inert gas (e.g., nitrogen) or vacuum treatment. The resin blend is then injection-molded over an intermediate product (in this case, a sphere obtained by forming the envelope layer and the intermediate layer over the solid core) which has been placed in a mold. For smooth and easy handling, it is preferable for the resin blend to be formed into pellets having a length of 1 to 10 mm and a diameter of 0.5 to 5 mm. Sufficient isocyanate groups in an unreacted state remain in these resin pellets; the unreacted isocyanate groups react with component A or component C to form a crosslinked material, either while the resin blend is being injection-molded over the intermediate product or due to post-treatment thereafter, such as annealing.

Various additives such as pigments, dispersants, antioxidants, ultraviolet absorbers, ultraviolet stabilizers, mold release agents, plasticizers, and inorganic fillers (e.g., zinc oxide, barium sulfate, titanium dioxide) may be optionally included in the above-described resin composition, i.e., the outermost layer-forming material.

The melt flow rate of the above outermost layer-forming material at 210° C. is not subject to any particular limitation. However, to increase the flow properties and manufacturability, the melt flow rate is preferably at least 5 g/10 min, more preferably at least 20 g/10 min, and even more preferably at least 50 g/10 min. If the melt flow rate of the material is too small, the flow properties will decrease, which may cause eccentricity during injection molding and may also lower the degree of freedom of design in the outermost layer thickness. The melt flow rate is measured in accordance with JIS K 7210-1999.

An example of a method which may be employed to mold the outermost layer involves feeding the above outermost layer-forming material to an injection molding machine, and injecting the molten material over the intermediate layer. Although the molding temperature in this case will vary depending on the type of thermoplastic polyurethane, the molding temperature is generally in the range of 150 to 250° C.

When injection molding is carried out, it is desirable, though not essential, to subject some or all of the resin paths from the resin feed zone to the mold interior to purging with an inert gas such as nitrogen or a low-moisture gas such as low dew-point dry air, or to vacuum treatment, and thereby render the interior of the resin paths into a low-humidity environment. Preferred, non-limiting, examples of the medium used for transporting the resin under applied pressure include inert gases such as nitrogen and low-moisture gases such as low dew-point dry air. By molding the outermost layer in such a low-humidity environment, reactions by the isocyanate groups are suppressed as much as possible in the period up until the resin blend is charged into the mold interior. As a result, the resin blend has a stable viscosity and an improved moldability, in addition to which the real crosslinking efficiency can be increased.

Techniques that may be used to confirm the presence of isocyanate compound in an unreacted state within the resin blend prepared as described above include those which involve extraction with a suitable solvent that selectively dissolves out only the isocyanate compound. An example of a simple and convenient method is one in which confirmation is carried out by simultaneous thermogravimetric and differential thermal analysis (TG-DTA) measurement in an inert atmosphere. For example, when the resin blend (outermost layer material) used in this invention is heated in a nitrogen atmosphere at a temperature ramp-up rate of 10° C./min, a gradual drop in the weight of diphenylmethane diisocyanate can be observed from about 150° C. On the other hand, in a resin sample following complete reaction of the isocyanate groups, a weight drop is not observed from about 150° C., but a weight drop can be observed from about 230 to 240° C.

After the resin blend has been molded as described above, the properties as the outermost layer of a golf ball can be additionally improved by carrying out annealing so as to induce the crosslinking reactions to proceed further. "Annealing," as used herein, refers to aging the cover in a fixed environment for a fixed length of time.

By forming the outermost layer in the above manner, a distance-increasing effect is obtained, in addition to which the spin performance on approach shots improves, enabling both controllability and distance to be achieved.

When forming the outermost layer, although not subject to any particular limitation, to increase adhesion with the intermediate layer, it is desirable to first subject the surface of the intermediate layer (that is, the surface of the sphere after formation of the intermediate layer) to abrasion treatment. In addition, it is preferable to apply a primer (adhesive) to the surface of the intermediate layer following abrasion treatment or to add an adhesion reinforcing agent to the outermost layer-forming material. Examples of adhesion reinforcing agents that may be included in this material include organic compounds such as 1,3-butanediol and trimethylolpropane, and oligomers such as polyethylene glycol and polyhydroxy polyolefin oligomers. The use of trimethylolpropane or a polyhydroxy polyolefin oligomer is especially preferred. Examples of commercial products include trimethylolpropane available from Mitsubishi Gas Chemical Co., Ltd. and polyhydroxy polyolefin oligomers available from Mitsubishi Chemical Corporation (under the trade name "Polytail H"; number of main-chain carbons, 150 to 200; hydroxy-terminated).

Up to this point, details on the respective layers, i.e., the core inner layer, core outer layer, envelope layer, intermediate layer and outermost layer, have been described separately for each layer. Next, the relationships among these layers are described.

The surface hardness of the core outer layer is preferably set so as to be higher than the surface hardness of the core inner layer. Moreover, it is preferable for the center hardness of the core inner layer, the surface hardness of the core inner layer and the surface hardness of the core outer layer to satisfy the following condition:

$$\text{core inner layer center hardness} < \text{core inner layer surface hardness} < \text{core outer layer surface hardness}.$$

Also, the difference between the center hardness of the core inner layer and the surface hardness of the core outer layer, i.e., the value expressed as (core outer layer surface hardness)−(core inner layer center hardness), although not particularly limited, may be set to a Shore D hardness value of preferably at least 7, more preferably at least 10, and even more preferably at least 16. This hardness difference has no particular upper limit, although the Shore D hardness difference may be set to preferably not more than 45, more preferably not more than 40, and even more preferably not more than 35. By setting the hardness difference between the core inner layer center hardness and the core outer layer surface hardness within the above range, the spin rate on full shots can be suppressed.

The difference between the surface hardness of the core inner layer and the surface hardness of the core outer layer, i.e., the value expressed as (core outer layer surface hardness)−(core inner layer surface hardness), although not particularly limited, may be set to a Shore D hardness value of preferably at least 1, more preferably at least 4, and even more preferably at least 10. This hardness difference has no particular upper limit, although the Shore D hardness difference may be set to preferably not more than 39, more preferably not more than 34, and even more preferably not more than 29. If this hardness difference is too small, the spin rate on full shots may become too high, possibly resulting in a poor distance. On the other hand, if the hardness difference is too large, the feel at impact may be too hard and the durability of the ball to cracking on repeated impact may worsen.

The difference between the specific gravity of the core inner layer and the specific gravity of the core outer layer, i.e., the value expressed as (core outer layer specific gravity)−(core inner layer specific gravity), although not particularly limited, may be set to preferably −0.2 or above, more preferably −0.1 or above, and even more preferably −0.05 or above. This specific gravity difference has no particular upper limit, but may be set to preferably not more than 0.3, more preferably not more than 0.2, and even more preferably not more than 0.17. If the specific gravity difference between the core inner layer and the core outer layer falls outside of the above range, the rebound may decrease, possibly resulting in a poor distance.

The surface hardnesses (Shore D hardnesses) of the envelope layer, intermediate layer and outermost layer are not subject to any particular limitation, although it is preferable for the surface hardness of the intermediate layer to be higher than the surface hardness of the outermost layer and it is recommended that the surface hardnesses of these layers satisfy the following condition:

> envelope layer surface hardness<intermediate layer surface hardness>outermost layer surface hardness.

In this invention, by making the surface hardness of the intermediate layer higher than the surface hardnesses of the envelope layer and the outermost layer, the spin rate on full shots can be suppressed. Moreover, by forming, between the core and the intermediate layer, an envelope layer which is softer than the intermediate layer and has a relatively high resilience for the material hardness, the spin rate of the golf ball on full shots can be further suppressed. In addition, by making the surface hardness of the outermost layer lower than the surface hardness of the intermediate layer, a high controllability in the short game is conferred. Furthermore, it is advantageous for the surface hardnesses of the above respective layers to satisfy the following conditions.

The difference between the surface hardness of the core outer layer and the surface hardness of the envelope layer, i.e., the value expressed as (envelope layer surface hardness−core outer layer surface hardness), although not particularly limited, may be set to a Shore D hardness value of preferably −15 or above, more preferably −10 or above, and even more preferably −6 or above. Although there is no particular upper limit, this Shore D hardness difference may be set to preferably not more than 15, more preferably not more than 10, and even more preferably not more than 6. If the hardness difference between the core outer layer and the envelope layer falls outside of the above range, the ball may be too receptive to spin on full shots, possibly resulting in a poor distance.

The difference between the surface hardness of the envelope layer and the surface hardness of the intermediate layer, i.e., the value expressed as (intermediate layer surface hardness−envelope layer surface hardness), although not particularly limited, may be set to a Shore D hardness value of preferably at least 5, more preferably at least 7, and even more preferably at least 10. There is no particular upper limit, although this Shore D hardness difference may be set to preferably not more than 25, more preferably not more than 20, and even more preferably not more than 15. If this hardness difference is too large, the durability to cracking under repeated impact may worsen. On the other hand, if the hardness difference is too small, the spin rate on full shots may become too high, as a result of which a good distance may not be achieved.

The difference between the surface hardness of the intermediate layer and the surface hardness of the outermost layer (the surface hardness of the ball), i.e., the value expressed as (outermost layer surface hardness−intermediate layer surface hardness), although not particularly limited, may be set to a Shore D hardness value of preferably −25 or above, more preferably −20 or above, and even more preferably −15 or above. There is no particular upper limit, although this Shore D hardness difference may be set to preferably −1 or below, more preferably −4 or below, and even more preferably −8 or below. If this hardness difference is too large (i.e., if the above value is too large in the negative direction), the durability to cracking under repeated impact may worsen. On the other hand, if this hardness difference is too small, the spin rate in the short game may become too small.

The thicknesses of the core inner layer, core outer layer and envelope layer are not subject to any particular limitation, although they preferably satisfy the following condition:

> core inner layer radius>core outer layer thickness>envelope layer thickness.

By satisfying this condition, the spin rate on full shots can be suppressed, enabling a good distance to be achieved.

The thicknesses of the envelope layer, intermediate layer and outermost layer are not subject to any particular limitation, although they preferably satisfy the following condition:

> envelope layer thickness>intermediate layer thickness>outermost layer thickness.

By satisfying this condition, the spin rate on full shots can be suppressed, enabling a good distance to be achieved.

In the golf ball of the invention, as in conventional golf balls, numerous dimples may be formed on the surface of the ball (i.e., the surface of the outermost layer) in order to further increase the aerodynamic properties and extend the distance traveled by the ball. In such cases, the number of dimples formed on the ball surface, although not subject to any particular limitation, is preferably at least 280, more preferably at least 300, and even more preferably at least 320. The maximum number of dimples, although not subject to any particular limitation, may be set to preferably not more than 360, more preferably not more than 350, and even more preferably not more than 340. If the number of dimples is larger than the above range, the trajectory of the ball may become low, as a result of which a good distance may not be achieved. On the other hand, if the number of dimples is smaller than the above range, the ball trajectory may become high, as a result of which an increased distance may not be achieved.

The geometric arrangement of the dimples on the ball may be, for example, octahedral or icosahedral. In addition, the dimple shapes may be of one, two or more types suitably selected from among not only circular shapes, but also various polygonal shapes, such as square, hexagonal, pentagonal and triangular shapes, as well as dewdrop shapes and oval shapes. The dimple diameter (in polygonal shapes, the length of the diagonals), although not subject to any particular limitation, is preferably set to from 2.5 to 6.5 mm. In addition, the dimple depth, although not particularly limited, is preferably set to from 0.08 to 0.30 mm.

The value $V_0$, defined as the spatial volume of a dimple below the flat plane circumscribed by the dimple edge, divided by the volume of the cylinder whose base is the flat plane and whose height is the maximum depth of the dimple from the base, although not subject to any particular limitation, may be set to from 0.35 to 0.80 in this invention.

From the standpoint of reducing aerodynamic resistance, the ratio SR of the sum of individual dimple surface areas, each defined by the flat plane circumscribed by the edge of a dimple, with respect to the surface area of the ball sphere were the ball surface to have no dimples thereon, although not subject to any particular limitation, is preferably set to from 60 to 95%. This ratio SR can be increased by increasing the number of dimples formed, and also by intermingling dimples of a plurality of types of differing diameters or by giving the dimples shapes such that the distances between neighboring dimples (i.e., the widths of the lands) become substantially 0.

The ratio VR of the sum of the spatial volumes of individual dimples, each formed below the flat plane circumscribed by the edge of a dimple, with respect to the volume of the ball sphere were the ball surface to have no dimples thereon, although not subject to any particular limitation, may be set to from 0.6 to 1%.

In this invention, by setting the above $V_0$, SR and VR values in the foregoing ranges, the aerodynamic resistance is reduced, in addition to which a trajectory enabling a good distance to be achieved is readily obtained, making it possible to improve the flight performance.

The diameter of the golf ball obtained by forming the respective above-described layers has a diameter which should conform to the standards for golf balls, and is preferably not less than 42.67 mm. There is no particular upper limit in the golf ball diameter, although the diameter may be set to preferably not more than 44 mm, more preferably not more than 43.8 mm, even more preferably not more than 43.5 mm, and most preferably not more than 43 mm. The weight of the golf ball also is not subject to any particular limitation, although for similar reasons is preferably set in the range of 45.0 to 45.93 g.

In the practice of this invention, to enhance the design and durability of the golf ball, the surface of the ball (i.e., the surface of the outermost layer) may be subjected to various types of treatment, such as surface preparation, stamping and painting.

EXAMPLES

The following Examples and Comparative Examples are provided to illustrate the invention, and are not intended by way of limitation.

Examples 1 to 6, Comparative Examples 1 to 8

First, a core inner layer was formed using the materials shown in Table 1. In Examples 1 to 6 and Comparative Examples 3 to 8, the core inner layer was formed by injection molding. In Comparative Examples 1 and 2, the core inner layer was formed by preparing a rubber composition, followed by molding and vulcanization at 155° C. for 15 minutes.

TABLE 1

| Formulation (pbw) | Example | | | | | | Comparative Example | | | | | | | |
|---|---|---|---|---|---|---|---|---|---|---|---|---|---|---|
| | 1 (A) | 2 (A) | 3 (B) | 4 (B) | 5 (R) | 6 (R) | 1 (E) | 2 (F) | 3 (C) | 4 (D) | 5 (A) | 6 (B) | 7 (A) | 8 (A) |
| Hytrel 3046 | 100 | 100 | | | 50 | 50 | | | | | 100 | | 100 | 100 |
| Hytrel 4047 | | | 100 | 100 | 50 | 50 | | | | | | 100 | | |
| Hytrel SB654 | | | | | | | | | 100 | | | | | |
| Hytrel 5557 | | | | | | | | | | 100 | | | | |
| Polybutadiene rubber A | | | | | | | 20 | 95 | | | | | | |
| Polybutadiene rubber B | | | | | | | 80 | | | | | | | |
| Polyisoprene rubber | | | | | | | | 5 | | | | | | |
| Zinc acrylate | | | | | | | 31.3 | 29.9 | | | | | | |
| Organic peroxide | | | | | | | 1.2 | 1.2 | | | | | | |
| Antioxidant | | | | | | | 0.1 | 0.1 | | | | | | |
| Zinc oxide | | | | | | | 4 | 4 | | | | | | |
| Barium sulfate | | | | | | | 22.2 | 22.7 | | | | | | |

Details on the materials in Table 1 are given below.
Hytrel: Thermoplastic polyether ester elastomers available from DuPont-Toray Co., Ltd.
Polybutadiene A: "BR01" from JSR Corporation
Polybutadiene B: "BR51" from JSR Corporation
Polyisoprene rubber: "IR2200" from JSR Corporation
Zinc acrylate: Available from Nihon Jyoryu Kogyo Co., Ltd.
Organic peroxide: "Perhexa C-40" from NOF Corporation; a mixture of 1,1-bis(t-butylperoxy)-cyclohexane and silica Antioxidant: "Nocrac 200" from Ouchi Shinko Chemical Industry Co., Ltd.; 2,6-di-t-butyl-4-methylphenol,
Zinc oxide: Available from Sakai Chemical Co. Ltd.
Barium sulfate: Available as "Precipitated Barium Sulfate 100" from Sakai Chemical Co., Ltd.

Figure 2:
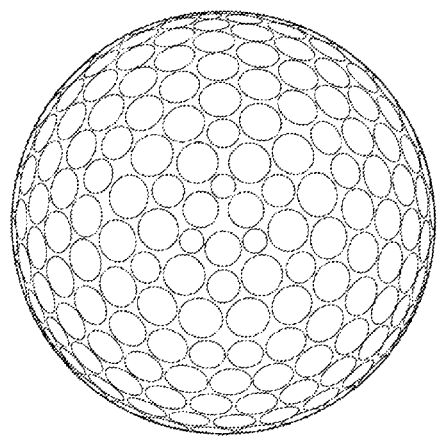
FIG. 2 is a top view showing the arrangement of dimples formed on the surface of the balls in the examples.

Next, a core outer layer was formed using the material shown in Table 2. In Examples 1 to 6 and Comparative Examples 1, 3, 4 and 6 to 8, rubber compositions were prepared using a roll mill, then subjected to primary vulcanization (semi-vulcanization) at 35° C. for 3 minutes to produce a pair of hemispherical half-cups. The above core inner layer was then enclosed within the resulting half-cups and secondary vulcanization (complete vulcanization) was carried out for 14 minutes at 155° C. within a mold, thereby forming the core outer layer. In Comparative Example 5, the core outer layer was formed by an injection molding process. In Comparative Example 2, the core was composed of a single layer, and so a core outer layer was not formed.

resin material (No. 4 or No. 5) over the intermediate layer formed as described above, thereby giving a multi-piece solid golf ball with a five-layer structure composed of a two-layer solid core that is encased by, in turn, an envelope layer, an intermediate layer and an outermost layer. Dimples having the configuration shown in FIG. 2 were formed, simultaneously with formation of the outermost layer, on the surfaces of all the balls thus obtained. Details on the dimples are shown below in Table 4. Details on the golf balls thus produced are shown in Tables 5 and 6.

TABLE 3

| Formulation (pbw) | No. 1 | No. 2 | No. 3 | No. 4 | No. 5 | No. 6 |
|---|---|---|---|---|---|---|
| Nucrel AN4319 | 49.25 | | | | | |
| Magnesium stearate | 49.25 | | | | | |
| Magnesium oxide | 1.4 | | | | | |

TABLE 2

| Formulation (pbw) | Example | | | | | | Comparative Example | | | | | | | |
|---|---|---|---|---|---|---|---|---|---|---|---|---|---|---|
| | 1 (G) | 2 (H) | 3 (I) | 4 (J) | 5 (S) | 6 (T) | 1 (K) | 2 (L) | 3 (M) | 4 (N) | 5 (O) | 6 (P) | 7 (Q) | 8 (H) |
| Hytrel 5557 | | | | | | | | — | | | 50 | | | |
| Hytrel 6347 | | | | | | | | — | | | 50 | | | |
| Polybutadiene rubber A | 20 | 20 | 20 | 20 | | | 20 | — | 20 | 20 | | 20 | 20 | 20 |
| Polybutadiene rubber B | 80 | 80 | 80 | 80 | 100 | 100 | 80 | — | 80 | 80 | | 80 | 80 | 80 |
| Zinc acrylate | 40 | 34 | 40 | 34 | 44.5 | 38 | 34 | — | 40 | 34 | | 22 | 52 | 34 |
| Organic peroxide | 1.2 | 1.2 | 1.2 | 1.2 | 1.2 | 1.2 | 1.2 | — | 1.2 | 1.2 | | 1.2 | 1.2 | 1.2 |
| Antioxidant | 0.1 | 0.1 | 0.1 | 0.1 | 0.1 | 0.1 | 0.1 | — | 0.1 | 0.1 | | 0.1 | 0.1 | 0.1 |
| Zinc oxide | 4 | 4 | 4 | 4 | 32.6 | 34.8 | 4 | — | 4 | 4 | | 4 | 4 | 4 |
| Barium sulfate | 25.5 | 27.9 | 22.6 | 25.0 | | | 20.9 | — | 23.2 | 21.3 | | 29.9 | 20.8 | 27.9 |
| Zinc salt of pentachlorothiophenol | 0.1 | 0.1 | 0.1 | 0.1 | 1.0 | 1.0 | 0.1 | — | 0.1 | 0.1 | | 0.1 | 0.1 | 0.1 |

Details on the materials in Table 2 are given below.
Hytrel: Thermoplastic polyether ester elastomers available from DuPont-Toray Co., Ltd.
Polybutadiene A: "BR01" from JSR Corporation
Polybutadiene B: "BR51" from JSR Corporation
Zinc acrylate: Available from Nihon Jyoryu Kogyo Co., Ltd.
Organic peroxide: "Perhexa C-40" from NOF Corporation; a mixture of 1,1-bis(t-butylperoxy)-cyclohexane and silica
Antioxidant: "Nocrac 200" from Ouchi Shinko Chemical Industry Co., Ltd.; 2,6-di-t-butyl-4-methylphenol,
Zinc oxide: Available from Sakai Chemical Co. Ltd.
Barium sulfate: Available as "Precipitated Barium Sulfate 100" from Sakai Chemical Co., Ltd.

An envelope layer was then formed by injection-molding the resin material shown as No. 1 or No. 6 in Table 3 over the core outer layer formed as described above. An intermediate layer was subsequently formed by injection-molding the resin material shown as No. 2 or No. 3 in Table 3 over the envelope layer formed as just described. Next, the starting materials shown under No. 4 or No. 5 in Table 3 were mixed under a nitrogen atmosphere in a twin-screw extruder so as to obtain a resin material in the form of pellets having a length of 3 mm and a diameter of 1 to 2 mm. An outermost layer was then formed by injection-molding the resulting pelletized TABLE 3-continued

| Formulation (pbw) | No. 1 | No. 2 | No. 3 | No. 4 | No. 5 | No. 6 |
|---|---|---|---|---|---|---|
| Colorant | 0.1 | | | | | |
| Himilan 1601 | | | 50 | | | |
| Himilan 1855 | | | 50 | | | |
| Himilan 1605 | | 50 | | | | |
| Himilan 1706 | | 35 | | | | |
| Himilan 1557 | | 15 | | | | |
| Trimethylolpropane | | 1.1 | 1.1 | | | |
| HPF1000 | | | | | | 100 |
| Pandex T-8290 | | | | 37.5 | | |
| Pandex T-8283 | | | | 62.5 | | |
| Pandex T-8295 | | | | | 100 | |
| Titanium oxide | | | | 3.5 | 3.5 | |
| Polyethylene wax | | | | 1.5 | 1.5 | |
| Isocyanate compound | | | | 9 | 9 | |

Details on the materials in Table 3 are given below.
Nucrel AN4319: An ethylene-methacrylic acid-acrylic acid ester terpolymer available from DuPont-Mitsui Polychemicals Co., Ltd.
Magnesium stearate: Available as "Magnesium Stearate G" from NOF Corporation
Magnesium oxide: Available as "Kyowamag MF150" from Kyowa Chemical Industry Co., Ltd.

Colorant: Quinacridone Red
Himilan: Ionomer resins available from DuPont-Mitsui Polychemicals Co., Ltd.
HPF1000 Ionomer resin available from E.I. DuPont de Nemours & Co.
Pandex: MDI-PTMG type thermoplastic polyurethanes available from DIC Bayer Polymer
Titanium oxide: Available as "Tipaque R680" from Ishihara Sangyo Kaisha, Ltd.
Polyethylene wax: Available as "Sanwax 161P" from Sanyo Chemical Industries, Ltd.
Isocyanate compound: 4,4'-Diphenylmethane diisocyanate

TABLE 4

| No. | Number of dimples | Diameter (mm) | Depth (mm) | $V_0$ | SR (%) | VR (%) |
|---|---|---|---|---|---|---|
| 1 | 12 | 4.6 | 0.15 | 0.47 | 81 | 0.78 |
| 2 | 234 | 4.4 | 0.15 | 0.47 | | |
| 3 | 60 | 3.8 | 0.14 | 0.47 | | |
| 4 | 6 | 3.5 | 0.13 | 0.46 | | |
| 5 | 6 | 3.4 | 0.13 | 0.46 | | |
| 6 | 12 | 2.6 | 0.10 | 0.46 | | |
| Total | 330 | | | | | |

Dimple Definitions

Diameter: Diameter of flat plane circumscribed by edge of dimple.
Depth: Maximum depth of dimple from flat plane circumscribed by edge of dimple.
$V_0$: Spatial volume of dimple below flat plane circumscribed by dimple edge, divided by volume of cylinder whose base is the flat plane and whose height is the maximum depth of dimple from the base.
SR: Sum of individual dimple surface areas, each defined by the flat plane circumscribed by the edge of the dimple, as a percentage of the surface area of a hypothetical sphere were the ball to have no dimples on the surface thereof.
VR: Sum of spatial volumes of individual dimples formed below flat plane circumscribed by the edge of the dimple, as a percentage of the volume of a hypothetical sphere were the ball to have no dimples on the surface thereof.

The following measurements and evaluations were carried out on the golf balls obtained. The results are shown in Tables 5 and 6.

(1) Center Hardness of Core

The core was cut in half (through the center) and measurement was carried out by perpendicularly pressing the indenter of a type D durometer conforming ASTM D2240-95 against the center of the resulting cross-section. These hardnesses are all measured values obtained after holding the core isothermally at 23° C. The results obtained by measuring these center hardnesses as JIS-C hardness values (in accordance with JIS K 6301) are also shown in Tables 5 and 6.

(2) Surface Hardnesses of Core, Envelope Layer, Intermediate Layer and Outermost Layer Measurement was carried out by perpendicularly pressing the indenter of a type D durometer conforming to ASTM D2240-95 against the surface of the intermediate product or ball at the stage where the layer to be measured has been formed. The surface hardness of the ball (i.e., the surface hardness of the outermost layer) is the value measured at a land area; that is, at a place on the ball surface where a dimple is not formed.

The above hardnesses are all measured values obtained after holding the intermediate product isothermally at 23° C. The results obtained by measuring these surface hardnesses as JIS-C hardness values (in accordance with JIS K 6301) are also shown in Tables 5 and 6.

(3) Material Hardnesses of Envelope Layer and Intermediate Layer

The procedure was the same both for the envelope layer-forming material and for the intermediate layer-forming material. In each case, the layer-forming material was molded into sheets having a thickness of about 2 mm and held for two weeks at 23° C., following which the sheets were stacked to a thickness of at least 6 mm and the hardness was measured with a type D durometer conforming to ASTM D2240-95. The results obtained by measuring these material hardnesses as JIS-C hardness values (in accordance with JIS K 6301) are also shown in Tables 5 and 6.

(4) Material Hardness of Outermost Layer

In each example, a 2 mm thick sheet obtained by injection molding the outermost layer-forming material was annealed at 100° C. for 8 hours and left to stand one week at room temperature, following which the hardness was measured with a type D durometer conforming to ASTM D2240-95. The results obtained by measuring these material hardnesses as JIS-C hardness values (in accordance with JIS K 6301) are also shown in Tables 5 and 6.

(5) Flight Performance

A driver (W#1) was mounted on a golf swing robot, and the spin rate, carry and total distance when the ball was struck at a head speed of 45 m/s was measured. The club used was a TourStage X-Drive 707 (2012 model; loft angle, 9.5°) manufactured by Bridgestone Sports Co., Ltd. The rating criteria in the table were as follows.

Good: Total distance was 227 m or more
NG: Total distance was less than 227 m (6) Spin Rate on Approach Shots A sand wedge (SW) was mounted on a golf swing robot, and the spin rate when the ball was struck at a head speed of 20 m/s was measured. The club used was a TourStage X-WEDGE (loft angle, 56°) manufactured by Bridgestone Sports Co., Ltd. The rating criteria in the table were as follows.

Good: Spin rate on approach shots was 6,000 rpm or more
NG: Spin rate on approach shots was less than 6,000 rpm (7) Durability to Cracking The ball was repeatedly hit at a head speed of 45 m/s with a driver (W#1) mounted on a golf swing robot, and the number of shots that had been taken when the ball began to crack was determined. The club used was a TourStage X-Drive 707 (2012 model; loft angle, 9.5°) manufactured by Bridgestone Sports Co., Ltd. Tables 5 and 6 show the results obtained by calculating durability indices for the respective examples and comparative examples, relative to an arbitrary index of 100 for the average number of shots taken with the balls (n=5) in Example 1 when cracking began, and rating the durability to cracking according to the following criteria.

Good: Durability index was 90 or more
Fair: Durability index was less than 90

TABLE 5

| | | Example 1 | Example 2 | Example 3 | Example 4 | Example 5 | Example 6 |
|---|---|---|---|---|---|---|---|
| Core inner layer | Material | (A) | (A) | (B) | (B) | (R) | (R) |
| | Diameter (mm) | 22.0 | 22.0 | 22.0 | 22.0 | 23.4 | 23.4 |
| | Weight (g) | 6.0 | 6.0 | 6.2 | 6.2 | 7.3 | 7.3 |
| | Specific gravity | 1.07 | 1.07 | 1.12 | 1.12 | 1.10 | 1.10 |
| | Material hardness (Shore D) | 27 | 27 | 40 | 40 | 34 | 34 |
| | Surface hardness (JIS-C) | 54 | 54 | 71 | 71 | 63 | 63 |
| | Surface hardness (Shore D) | 33 | 33 | 46 | 46 | 40 | 40 |
| | Center hardness (JIS-C) | 46 | 46 | 63 | 63 | 55 | 55 |
| | Center hardness (Shore D) | 27 | 27 | 40 | 40 | 34 | 34 |
| | Surface hardness-center hardness (JIS-C) | 8 | 8 | 8 | 8 | 8 | 8 |
| | Surface hardness-center hardness (Shore D) | 6 | 6 | 6 | 6 | 6 | 6 |
| Core outer layer | Material | (G) | (H) | (I) | (J) | (S) | (T) |
| | Thickness (mm) | 7.1 | 7.1 | 7.1 | 7.1 | 6.0 | 6.0 |
| | Specific gravity | 1.23 | 1.23 | 1.22 | 1.22 | 1.26 | 1.27 |
| | Surface hardness (JIS-C) | 91 | 87 | 91 | 87 | 89 | 87 |
| | Surface hardness (Shore D) | 61 | 58 | 61 | 58 | 60 | 58 |
| Overall core | Diameter (mm) | 36.1 | 36.1 | 36.1 | 36.1 | 35.4 | 35.4 |
| | Weight (g) | 29.5 | 29.5 | 29.5 | 29.5 | 28.2 | 28.3 |
| Envelope layer | Material | No. 1 | No. 1 | No. 1 | No. 1 | No. 6 | No. 6 |
| | Thickness (mm) | 1.35 | 1.35 | 1.35 | 1.35 | 1.71 | 1.71 |
| | Specific gravity | 0.95 | 0.95 | 0.95 | 0.95 | 0.96 | 0.96 |
| | Surface hardness (JIS-C) | 83 | 83 | 83 | 83 | 87 | 87 |
| | Surface hardness (Shore D) | 55 | 55 | 55 | 55 | 58 | 58 |
| | Material hardness (JIS-C) | 75 | 75 | 75 | 75 | 79 | 79 |
| | Material hardness (Shore D) | 49 | 49 | 49 | 49 | 52 | 52 |
| Envelope layer-encased sphere | Diameter (mm) | 38.8 | 38.8 | 38.8 | 38.8 | 38.8 | 38.8 |
| | Weight (g) | 35.1 | 35.1 | 35.1 | 35.1 | 35.3 | 35.4 |
| Intermediate layer | Material | No. 2 | No. 2 | No. 2 | No. 2 | No. 2 | No. 2 |
| | Thickness (mm) | 1.15 | 1.15 | 1.15 | 1.15 | 1.14 | 1.14 |
| | Specific gravity | 0.95 | 0.95 | 0.95 | 0.95 | 0.95 | 0.95 |
| | Surface hardness (JIS-C) | 100 | 100 | 100 | 100 | 100 | 100 |
| | Surface hardness (Shore D) | 68 | 68 | 68 | 68 | 68 | 68 |
| | Material hardness (JIS-C) | 92 | 92 | 92 | 92 | 92 | 92 |
| | Material hardness (Shore D) | 62 | 62 | 62 | 62 | 62 | 62 |
| Intermediate layer-encased sphere | Diameter (mm) | 41.1 | 41.1 | 41.1 | 41.1 | 41.1 | 41.1 |
| | Weight (g) | 40.6 | 40.6 | 40.6 | 40.6 | 40.7 | 40.8 |
| Outermost layer | Material | No. 4 | No. 4 | No. 4 | No. 4 | No. 4 | No. 4 |
| | Thickness (mm) | 0.8 | 0.8 | 0.8 | 0.8 | 0.8 | 0.8 |
| | Specific gravity | 1.12 | 1.12 | 1.12 | 1.12 | 1.12 | 1.12 |
| | Surface hardness (JIS-C) | 87 | 87 | 87 | 87 | 87 | 87 |
| | Surface hardness (Shore D) | 58 | 58 | 58 | 58 | 58 | 58 |
| | Material hardness (JIS-C) | 68 | 68 | 68 | 68 | 68 | 68 |
| | Material hardness (Shore D) | 44 | 44 | 44 | 44 | 44 | 44 |
| Ball | Diameter (mm) | 42.7 | 42.7 | 42.7 | 42.7 | 42.7 | 42.7 |
| | Weight (g) | 45.5 | 45.5 | 45.5 | 45.5 | 45.4 | 45.5 |
| Core outer layer specific gravity-Core inner layer specific gravity | | 0.16 | 0.16 | 0.10 | 0.10 | 0.17 | 0.18 |
| Core outer layer surface hardness-Core inner layer center hardness (Shore D) | | 34 | 31 | 21 | 18 | 26 | 24 |
| Core outer layer surface hardness-Core inner layer surface hardness (Shore D) | | 28 | 25 | 15 | 12 | 20 | 18 |
| Envelope layer surface hardness-Core outer layer surface hardness (Shore D) | | −6 | −3 | −6 | −3 | −2 | 0 |
| Intermediate layer surface hardness-Envelope layer surface hardness (Shore D) | | 13 | 13 | 13 | 13 | 10 | 10 |
| Outermost layer surface hardness-Intermediate layer surface hardness (Shore D) | | −10 | −10 | −10 | −10 | −10 | −10 |
| Performance evaluation | Flight performance on shots with W#1 — Spin rate (rpm) | 2,817 | 2,834 | 2,847 | 2,859 | 2,832 | 2,772 |
| | Carry (m) | 211.3 | 211.5 | 211.5 | 211.2 | 212.7 | 212.3 |
| | Total distance (m) | 228.1 | 227.8 | 228.8 | 228.4 | 230.0 | 229.5 |
| | Rating | good | good | good | good | good | good |
| | Spin rate on approach shots — Spin rate (rpm) | 6,134 | 6,120 | 6,183 | 6,165 | 6,157 | 6,145 |
| | Rating | good | good | good | good | good | good |
| | Durability to cracking | good | good | good | good | good | good |

TABLE 6

| | | Comparative Example | | | | | | | |
|---|---|---|---|---|---|---|---|---|---|
| | | 1 | 2 | 3 | 4 | 5 | 6 | 7 | 8 |
| Core inner layer | Material | (E) | (F) | (C) | (D) | (A) | (B) | (A) | (A) |
| | Diameter (mm) | 22.0 | 36.1 | 22.0 | 22.0 | 22.0 | 22.0 | 22.0 | 22.0 |
| | Weight (g) | 6.7 | 29.5 | 6.2 | 6.6 | 6.0 | 6.2 | 6.0 | 6.0 |
| | Specific gravity | 1.20 | 1.20 | 1.11 | 1.19 | 1.07 | 1.12 | 1.07 | 1.07 |
| | Material hardness (Shore D) | — | — | 20 | 55 | 27 | 40 | 27 | 27 |
| | Surface hardness (JIS-C) | 74 | 82 | 45 | 91 | 54 | 71 | 54 | 54 |
| | Surface hardness (Shore D) | 48 | 54 | 26 | 61 | 33 | 46 | 33 | 33 |
| | Center hardness (JIS-C) | 51 | 60 | 37 | 83 | 46 | 63 | 46 | 46 |
| | Center hardness (Shore D) | 31 | 37 | 20 | 55 | 27 | 40 | 27 | 27 |
| | Surface hardness-center hardness (JIS-C) | 23 | 22 | 8 | 8 | 8 | 8 | 8 | 8 |
| | Surface hardness - center hardness (Shore D) | 18 | 16 | 6 | 6 | 6 | 6 | 6 | 6 |
| Core outer layer | Material | (K) | (L) | (M) | (N) | (O) | (P) | (Q) | (H) |
| | Thickness (mm) | 7.1 | — | 7.1 | 7.1 | 7.1 | 7.1 | 7.1 | 7.1 |
| | Specific gravity | 1.20 | — | 1.22 | 1.20 | 1.22 | 1.22 | 1.23 | 1.23 |
| | Surface hardness (JIS-C) | 87 | — | 91 | 87 | 96 | 80 | 98 | 87 |
| | Surface hardness (Shore D) | 58 | — | 61 | 58 | 65 | 52 | 67 | 58 |
| Overall core | Diameter (mm) | 36.1 | — | 36.1 | 36.1 | 36.1 | 36.1 | 36.1 | 36.1 |
| | Weight (g) | 29.5 | — | 29.5 | 29.5 | 29.1 | 29.5 | 29.5 | 29.5 |
| Envelope layer | Material | No. 1 | No. 1 | No. 1 | No. 1 | No. 1 | No. 1 | No. 1 | No. 1 |
| | Thickness (mm) | 1.35 | 1.35 | 1.35 | 1.35 | 1.35 | 1.35 | 1.35 | 1.35 |
| | Specific gravity | 0.95 | 0.95 | 0.95 | 0.95 | 0.95 | 0.95 | 0.95 | 0.95 |
| | Surface hardness (JIS-C) | 83 | 83 | 83 | 83 | 83 | 83 | 83 | 83 |
| | Surface hardness (Shore D) | 55 | 55 | 55 | 55 | 55 | 55 | 55 | 55 |
| | Material hardness (JIS-C) | 75 | 75 | 75 | 75 | 75 | 75 | 75 | 75 |
| | Material hardness (Shore D) | 49 | 49 | 49 | 49 | 49 | 49 | 49 | 49 |
| Envelope layer-encased sphere | Diameter (mm) | 38.8 | 38.8 | 38.8 | 38.8 | 38.8 | 38.8 | 38.8 | 38.8 |
| | Weight (g) | 35.1 | 35.1 | 35.1 | 35.1 | 34.8 | 35.1 | 35.1 | 35.1 |
| Intermediate layer | Material | No. 2 | No. 2 | No. 2 | No. 2 | No. 2 | No. 2 | No. 2 | No. 3 |
| | Thickness (mm) | 1.15 | 1.15 | 1.15 | 1.15 | 1.15 | 1.15 | 1.15 | 1.15 |
| | Specific gravity | 0.95 | 0.95 | 0.95 | 0.95 | 0.95 | 0.95 | 0.95 | 0.95 |
| | Surface hardness (JIS-C) | 100 | 100 | 100 | 100 | 100 | 100 | 100 | 91 |
| | Surface hardness (Shore D) | 68 | 68 | 68 | 68 | 68 | 68 | 68 | 61 |
| | Material hardness (JIS-C) | 92 | 92 | 92 | 92 | 92 | 92 | 92 | 83 |
| | Material hardness (Shore D) | 62 | 62 | 62 | 62 | 62 | 62 | 62 | 55 |
| Intermediate layer-encased sphere | Diameter (mm) | 41.1 | 41.1 | 41.1 | 41.1 | 41.1 | 41.1 | 41.1 | 41.1 |
| | Weight (g) | 40.6 | 40.6 | 40.6 | 40.6 | 40.3 | 40.6 | 40.6 | 40.6 |
| Outermost layer | Material | No. 4 | No. 4 | No. 4 | No. 4 | No. 4 | No. 4 | No. 4 | No. 5 |
| | Thickness (mm) | 0.8 | 0.8 | 0.8 | 0.8 | 0.8 | 0.8 | 0.8 | 0.8 |
| | Specific gravity | 1.12 | 1.12 | 1.12 | 1.12 | 1.12 | 1.12 | 1.12 | 1.12 |
| | Surface hardness (JIS-C) | 87 | 87 | 87 | 87 | 87 | 87 | 87 | 92 |
| | Surface hardness (Shore D) | 58 | 58 | 58 | 58 | 58 | 58 | 58 | 62 |
| | Material hardness (JIS-C) | 68 | 68 | 68 | 68 | 68 | 68 | 68 | 85 |
| | Material hardness (Shore D) | 44 | 44 | 44 | 44 | 44 | 44 | 44 | 57 |
| Ball | Diameter (mm) | 42.7 | 42.7 | 42.7 | 42.7 | 42.7 | 42.7 | 42.7 | 42.7 |
| | Weight (g) | 45.5 | 45.5 | 45.5 | 45.5 | 45.1 | 45.5 | 45.5 | 45.5 |
| | Core outer layer specific gravity-Core inner layer specific gravity | 0.00 | — | 0.11 | 0.01 | 0.15 | 0.10 | 0.16 | 0.16 |
| | Core outer layer surface hardness-Core inner layer center hardness (Shore D) | 28 | 22 | 41 | 3 | 38 | 12 | 40 | 31 |
| | Core outer layer surface hardness-Core inner layer surface hardness (Shore D) | 10 | — | 35 | −3 | 32 | 6 | 34 | 25 |
| | Envelope layer surface hardness-Core outer layer surface hardness (Shore D) | −3 | 1 | −6 | −3 | −10 | 3 | −12 | −3 |
| | Intermediate layer surface hardness-Envelope layer surface hardness (Shore D) | 13 | 13 | 13 | 13 | 13 | 13 | 13 | 6 |

TABLE 6-continued

|  |  |  | Comparative Example | | | | | | | |
|---|---|---|---|---|---|---|---|---|---|---|
|  |  |  | 1 | 2 | 3 | 4 | 5 | 6 | 7 | 8 |
|  | Outermost layer surface hardness-Intermediate layer surface hardness (Shore D) |  | −10 | −10 | −10 | −10 | −10 | −10 | −10 | 1 |
| Performance evaluation | Flight performance on shots with W#1 | Spin rate (rpm) | 2,904 | 2,938 | 2,798 | 3,014 | 2,852 | 2,912 | 2,825 | 2,794 |
|  |  | Carry (m) | 211.0 | 211.2 | 208.9 | 209.3 | 206.1 | 210.5 | 211.6 | 207.5 |
|  |  | Total distance (m) | 225.5 | 224.8 | 227.1 | 223.1 | 220.3 | 225.8 | 227.9 | 222.8 |
|  |  | Rating | NG | NG | good | NG | NG | NG | good | NG |
|  | Spin rate on approach shots | Spin rate (rpm) | 6,155 | 6,131 | 6,112 | 6,182 | 6,122 | 6,132 | 6,185 | 5,755 |
|  |  | Rating | good | good | good | good | good | good | good | NG |
|  | Durability to cracking |  | good | good | NG | good | good | good | NG | good |

The results in Tables 5 and 6 show that the comparative examples were inferior to the working examples of the invention in the following ways.

Comparative Example 1 was a golf ball having a core with a two-layer structure in which the core inner layer and the core outer layer were both formed of rubber materials. The spin rate on shots with a driver (W#1) was high, resulting in a poor distance.

Comparative Example 2 was a golf ball having a core with a single-layer structure formed of a rubber material. The ball had a high spin rate on shots with a driver (W#1), resulting in a poor distance.

In Comparative Example 3, the material hardness of the core inner layer was too soft, as a result of which the ball had a poor durability to cracking on repeated impact.

In Comparative Example 4, the material hardness of the core inner layer was too high and so the ball had a high spin rate on shots with a driver (W#1), resulting in a poor distance.

In Comparative Example 5, the core outer layer was formed of a resin material and so the ball had a low rebound, resulting in a poor distance.

In Comparative Example 6, the surface hardness of the core outer layer was too soft and so the ball had a high spin rate on shots with a driver (W#1), resulting in a poor distance.

In Comparative Example 7, because the surface hardness of the core outer layer was too hard, the ball had a poor durability to cracking on repeated impact.

In Comparative Example 8, the surface hardness of the ball (i.e., the surface hardness of the outermost layer) was too hard and so the ball was not sufficiently receptive to spin on approach shots. In addition, the ball had a low rebound, resulting in a poor distance on shots with a driver (W#1).

Japanese Patent Application No. 2013-143405 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising:
a core with a two-layer structure composed of an inner layer and an outer layer, and
a cover of three or more layers which is formed over the core and includes an envelope layer encasing the core, an intermediate layer encasing the envelope layer, and an outermost layer encasing the intermediate layer,
wherein the core inner layer is formed primarily of one or more type of thermoplastic elastomer selected from the group consisting of polyester, polyamide, polyurethane, olefin and styrene-type thermoplastic elastomers, and has a material hardness, expressed in terms of Shore D hardness, of from 10 to 50;
the core outer layer is formed of a rubber composition consisting primarily of a rubber material, and has a surface hardness, expressed in terms of Shore D hardness, of from 50 to 70; and
the intermediate layer has a higher surface hardness (Shore D hardness) than the outermost layer,
wherein the core, the envelope layer, the intermediate layer and the outermost layer have Shore D hardnesses which satisfy the following conditions:

envelope layer surface hardness<intermediate layer surface hardness>outermost layer surface hardness, and core inner layer center hardness<core inner layer surface hardness<core outer layer surface hardness, wherein the core and the envelope layer have thicknesses which satisfy the following condition:

core inner layer radius>core outer layer thickness>envelope layer thickness, wherein the difference between the surface hardness of the core inner layer and the surface hardness of the core outer layer, the value expressed as (core outer layer surface hardness)−(core inner layer surface hardness), is set to a Shore D hardness value of from 1 to 39.

2. The multi-piece solid golf ball of claim 1, wherein the core inner layer is formed primarily of a polyether ester elastomer.

3. The multi-piece solid golf ball of claim 1, wherein the core inner layer has a diameter of from 10 to 30 mm and the overall core has a diameter of from 30 to 40 mm.

4. The multi-piece solid golf ball of claim 1, wherein the outermost layer is formed of a material composed primarily of urethane.

5. The multi-piece solid golf ball of claim 1, wherein the outermost layer has been formed by injection-molding a single resin blend composed primarily of (A) a thermoplastic polyurethane and (B) a polyisocyanate compound, all the isocyanate groups in at least some portion of the polyisocyanate compound (B) being present in an unreacted state.

6. The multi-piece solid golf ball of claim 1, wherein the envelope layer is formed of a resin composition comprising:

100 parts by weight of a resin component composed of, in admixture,
(a) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(b) a non-ionomeric thermoplastic elastomer in a weight ratio between 100:0 and 50:50;
(c) from 5 to 120 parts by weight of a fatty acid and/or fatty acid derivative having a molecular weight of from 228 to 1500; and
(d) from 0.1 to 17 parts by weight of a basic inorganic metal compound capable of neutralizing un-neutralized acid groups in components (a) and (c).

7. The multi-piece solid golf ball of claim 1, wherein the envelope layer, intermediate layer and outermost layer have thicknesses which satisfy the following condition:

envelope layer thickness>intermediate layer thickness>outermost layer thickness.

8. The multi-piece solid golf ball of claim 1, wherein the envelope layer has a thickness of from 0.8 to 4.0 mm, and has a surface hardness, expressed in terms of Shore D hardness, of from 46 to 68.

9. The multi-piece solid golf ball of claim 1, wherein the difference between the surface hardness of the core outer layer and the surface hardness of the envelope layer, the value expressed as (envelope layer surface hardness−core outer layer surface hardness), is set to a Shore D hardness value of from −15 to 15.

10. The multi-piece solid golf ball of claim 1, wherein the difference between the surface hardness of the envelope layer and the surface hardness of the intermediate layer, the value expressed as (intermediate layer surface hardness−envelope layer surface hardness), is set to a Shore D hardness value of from 5 to 25.

11. The multi-piece solid golf ball of claim 1, wherein the difference between the surface hardness of the core inner layer and the surface hardness of the core outer layer, the value expressed as (core outer layer surface hardness)−(core inner layer surface hardness), is set to a Shore D hardness value of from 20 to 39.

12. The multi-piece solid golf ball of claim 1, wherein the difference between the specific gravity of the core inner layer and the specific gravity of the core outer layer, the value expressed as (core outer layer specific gravity)−(core inner layer specific gravity), is set the value of from 0.1 to 0.3.

* * * * *